United States Patent [19]

Johnson

[11] 4,173,891

[45] Nov. 13, 1979

[54] METHOD AND APPARATUS FOR MEASURING GAS FLOW

[75] Inventor: Nira C. Johnson, Pittsburgh, Pa.

[73] Assignee: Rockwell International Corporation, Pittsburgh, Pa.

[21] Appl. No.: 869,004

[22] Filed: Jan. 12, 1978

[51] Int. Cl.$^2$ .............................................. G01F 1/90
[52] U.S. Cl. .................................. 73/231 M; 364/497; 364/510
[58] Field of Search ................. 73/194 M, 231 M, 30; 364/496, 497, 499, 509, 510

[56] References Cited

U.S. PATENT DOCUMENTS

| | | | |
|---|---|---|---|
| 3,537,312 | 11/1970 | Moore | 73/231 M |
| 3,701,280 | 10/1972 | Stroman | 73/194 M |
| 3,752,393 | 8/1973 | Moseley | 364/510 |

*Primary Examiner*—James J. Gill
*Attorney, Agent, or Firm*—Albert G. Marriott; R. Lewis Gable

[57] ABSTRACT

There is disclosed a gas flow measuring and calculating system including a transducer for measuring line or flow pressure of the gas flowing through a conduit, a transducer for measuring the line or flow temperature of the aforementioned gas, a turbometer for measuring the gas flow through the conduit, and calculation means in the form of a microprocessor for repetitively calculating with high accuracy the base gas flow in terms of standard cubic feet, wherein the supercompressibility factor is computed based upon values of measured gas temperature and pressure for specific entered values of specific gravity and of the gas compaction, and there are a plurality of computing steps for each calculation of the base gas flow. During each computing step, an initially approximated value of this supercompressibility factor or the previously-calculated value is used to calculate and display continuously an indication of the base gas flow, it being understood that each computer step is insufficient to recalculate the supercompressibility factor, this calculation taking a plurality of steps.

21 Claims, 25 Drawing Figures

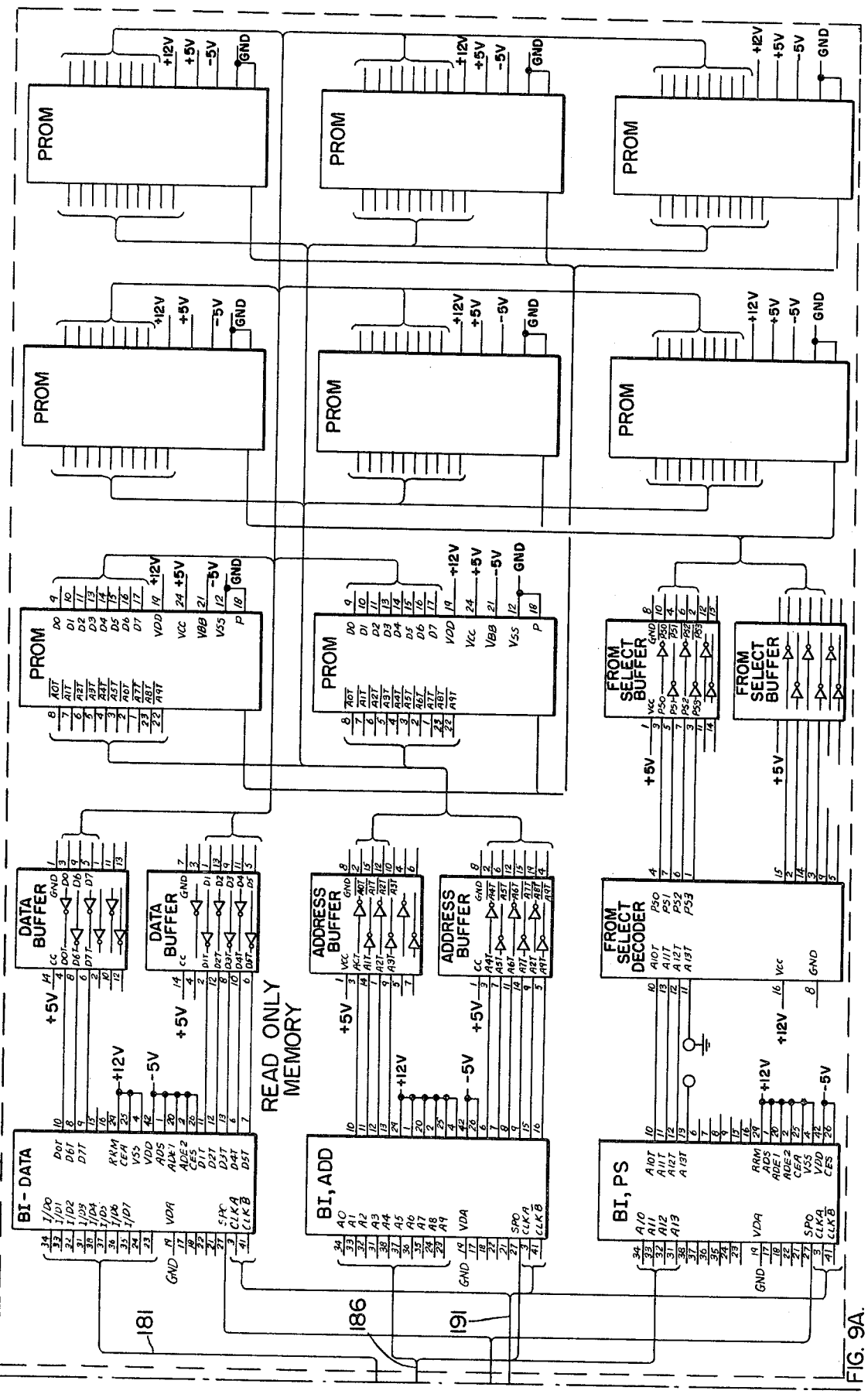

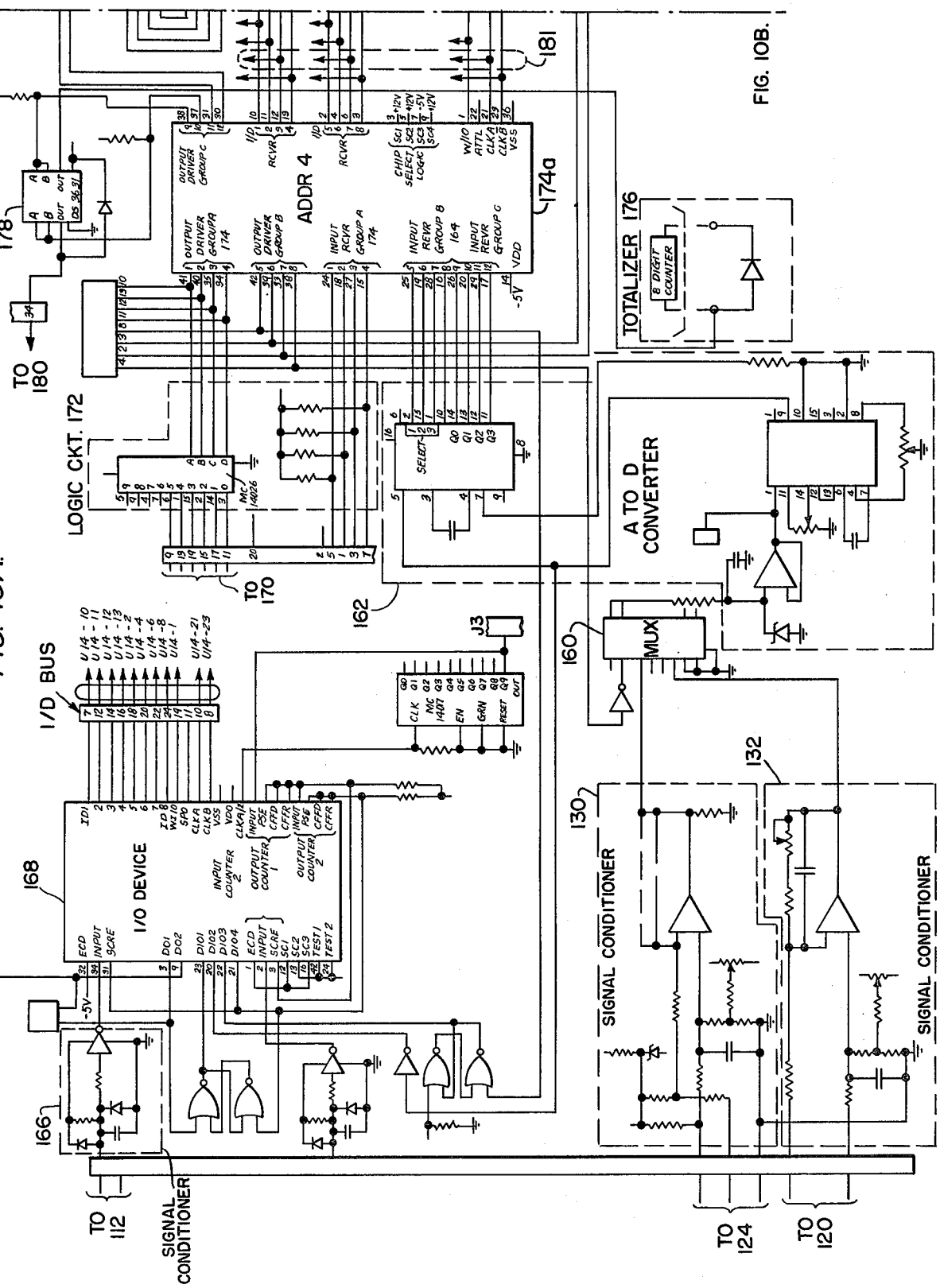

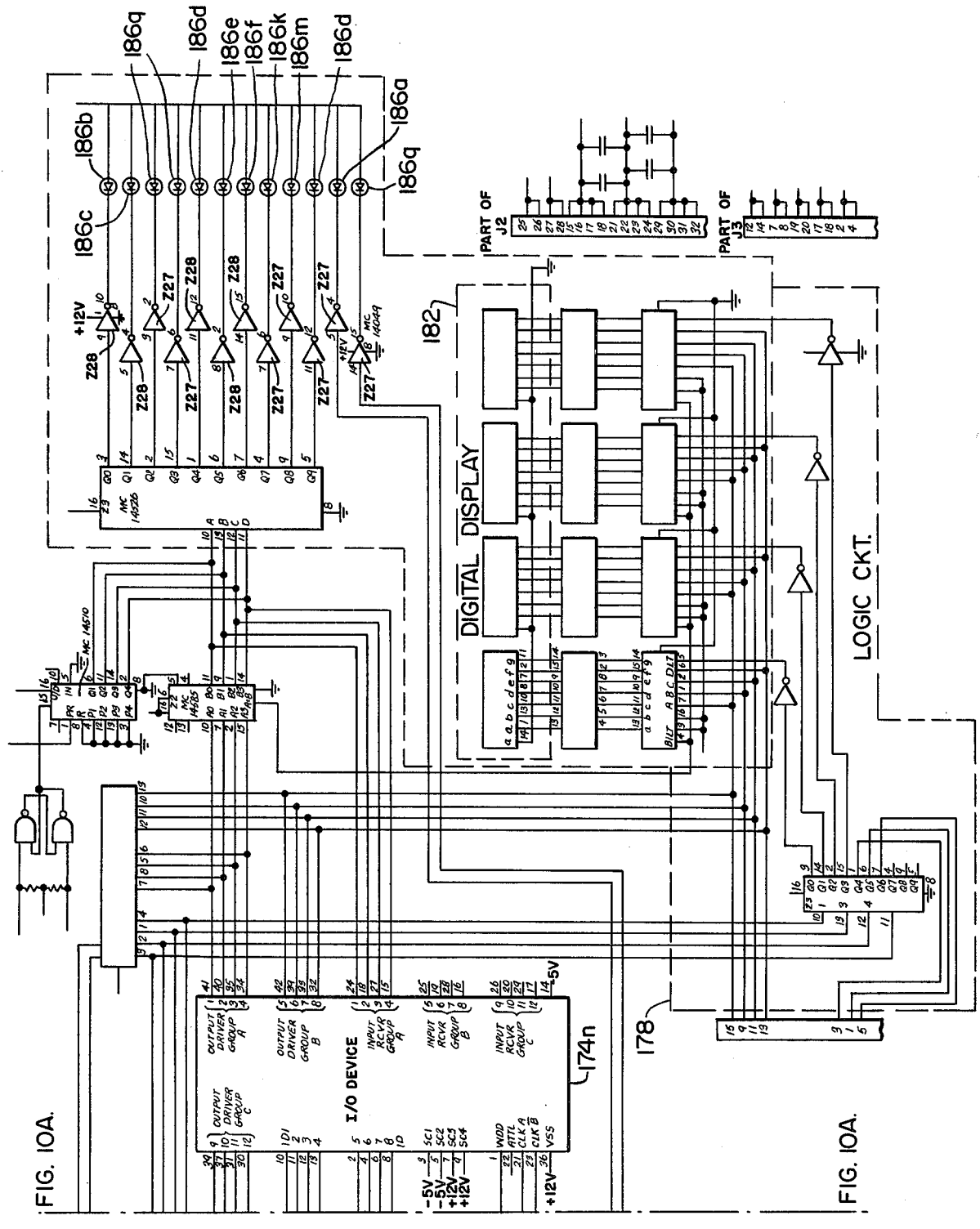

METHOD AND APPARATUS FOR MEASURING GAS FLOW

BACKGROUND OF THE INVENTION

1. Field of the Invention

This invention relates to systems and methods for measuring gas flow and in particular, for determining with high accuracy the supercompressibility factor, from which an indication of gas volume at base conditions may be calculated.

2. State of the Prior Art

In the past several years, the costs of all energy forms, first petroleum and other fuels such as natural gas, have risen drastically. Further, as supplies of petroleum, and in particular, imported petroleum, have dwindled, there has been a necessary reliance upon the supply of natural gas that is domestically available. Typically, such natural gas is transmitted via pipelines over great distances where the temperature and pressure conditions vary. For example, at the point of transmission the pressure may be in the range of 800–1,200 psi, whereas at an intermediate distributor, the pressure may be reduced to be in the order of 100–300 psi. At the level of distribution that would take place in a city, the pressure is still further reduced to a level in the order of 15 psi, whereas at the ultimate customer's home, the pressure may be in the order of 0.25 psi. Similarly, the temperature to which the gas is subjected may vary in the range of 0° to 50° C.

To distribute and sell gas that is exposed to these varying conditions, calculations must be made to convert the measured gas flow $V_f$ in terms of cubic feet at varying conditions of temperature $T_f$ and pressure $P_f$, to a standard cubic feet volume $V_b$ at specified, previously-agreed-upon base temperatures $T_b$ and base pressure $P_b$. To translate the measured volume $V_f$ of the flowing gas to the volume $V_b$, it is customary to apply the ideal gas equation, given as follows:

$$V_b = V_f S \frac{P_F T_b}{P_b T_F} \quad (1)$$

where $P_F = P_f + $ Atmos. Pressure Base, and $T_F = T_f + 459.67$.

As seen from equation (1), all gases vary in volume directly proportional to temperature and inversely proportional to pressure. Additionally and significantly, the translated or base volume $V_b$ also is a function of the supercompressibility factor S, this factor being of increasing significance at pressures above 50 psi.

The supercompressibility factor S is rather complicated to calculate, as will be seen below, since it is a function of three primary variables: pressure, temperature and specific gravity. The factor S is also a function of the composition of the gas being measured, in terms of mole percents of the gases such as nitrogen and carbon dioxide. Due to the complexity of this function, equipment has not been developed to automatically make the supercompressibility correction in the computation of the quantity of the flow of gas $V_b$. In some applications, it is possible to program an average value of the supercompressibility factor into a flow computer. However, where the pressure, temperature and specific gravity vary over a wide range, such an average factor is not particularly useful. Though a flow computer could normally be used in many applications, it will not because of an inability to provide an accurate indication of gas flow $V_b$ because of the difficulty to calculate the supercompressibility factor S.

The calculations for determining the supercompressibility factor S are given as follows:

$$S = F_p^2 V = \frac{\frac{B}{D} - D + \frac{n}{3 \cdot \pi_2}}{\left(1 + \frac{.00132}{T^{3.25}}\right)} \quad (2)$$

$$K_t = M_c + 1.681 M_n, \quad (4)$$

where $M_c$ is mole(s) of $CO_2$ and $M_n$ is mole(s) of N.

$$F_t = \frac{226.29}{(99.15 + 211.9 \, G - K_t)}, \quad (4)$$

where G is specific gravity.

$$T = \frac{(t + 459.6) F_t}{500.}, \quad (5)$$

where t is measured line temperature $$K_p = M_c - 0.392 M_n \quad (6)$$

$$F_p = \frac{156.47}{(160.8 - 7.22 \, G + K_p)} \quad (7)$$

$$\pi = \frac{P \cdot F_p + 14.7}{1000.} \quad (8)$$

where P is measured line pressure $$m = \left(.0330378 - \frac{.0221323}{T} + \frac{.0161353}{T^3}\right) \frac{1}{T^2} \quad (9)$$

$$n = \left(\frac{.265827}{T^2} + \frac{.0457697}{T^4} - \frac{.133185}{T}\right) \frac{1}{m} \quad (10)$$

$$B = \frac{3. - mn^2}{9. \, m\pi^2} \quad (11)$$

$$D = \{b + (b^2 + B^3)^{0.5}\}^{0.3333} \quad (12)$$

$$b = \left(\frac{9. \, n - 2. \, mn^3}{54. \, \pi} - \frac{E_2}{2}\right) \frac{1.}{m\pi^2} \quad (13)$$

$$E_2 = 1. - .00075(\pi)^{2.3}\{2. - e^{20(1.09 - T)}\} - \quad (14)$$
$$1.317(1.09T)^4 \pi(1.69 - \pi^2)$$

Equation 14 is valid for pressure ranges of 0–1300 psi and a temperature range of −40° F.+85° F., where $T_f$ is the flow temperature, $P_f$ is the flow pressure, G is the specific gravity of the gas being measured, $M_c$ is the percent mole concentration of the $CO_2$ component of the gas, and $M_n$ is the percent mole concentration of the nitrogen in the gas. Thus, it can be seen that it is quite complex to make an accurate determination of the supercompressibility factor S.

To more fully appreciate the nature of these measurements, reference is made to FIG. 1, wherein there is shown a conduit 10 through which natural gas is transmitted from a source to the ultimate user. Typically, the natural gas is made up of methane, ethane, propane and other components such as carbon dioxide and nitrogen, having specific percent moles thereof. The gas flow in terms of volume is metered by a gas turbine meter 12 having a rotor 13 that rotates as the gas flows through the meter 12 and exerts force on the blades of the rotor 13. A detector 14 detects the number of rotations of the rotor 13 and provides a series of discrete pulses via conductor 16 to a gas flow computer 30. The number of pulses generated by the detector 14 is an indication of the measured, uncorrected gas volume $V_f$ passing through the conduit 10. A static pressure transducer 20 monitors the pressure $P_f$ of the gas flowing in the conduit 10 as is supplied thereto through conduit 18, thereby to provide an output via conductor 22 to the computer 30 indicative of the measured pressure $P_f$. Further, a temperature transducer 24 having a temperature probe 26 disposed within the conduit 10 measures the temperature $T_f$ of the flowing gas to provide an electrical signal indicative thereof along conduit 28 to the computer 30. As will be explained, the purpose of this invention is to calculate with a high degree of accuracy the adjusted flow in terms of standard cubic feet $V_b$ at standard pressure and temperature $P_b$ and $T_b$. In the transmission and sale of natural gas, the factors such as standard pressure and temperature are contractually decided by the suppliers and distributors of natural gas. In keeping equation (1) to a form comparable to the gas laws, the uncorrected volume $V_f$ (cu. ft.) was inserted for the volume term. In a more detailed version, equation (1), $V_f=(K)(P)$ where $P$ = Pulses and $K$ = Cu. Ft./Pulse. The factor K as set out in equation (1) is a factor determined by the type of gas turbine meter 12 that is utilized.

The criticality of determining accurately the base or standard cubic feet $V_b$, is more fully comprehended when the quantity and thus the cost of providing natural gas is considered. It is contemplated that in a large transmission line, including perhaps as many as 7 conduits, as much as 9 million standard cubic feet per hour per conduit of natural gas may be transmitted. In the last few years, the price of natural gas has risen from approximately 30 cents to $2.00 per cubic foot, as measured at standard base conditions. Thus, the value of a single day's transmission of gas along a single transmission line may be in the order of $200 million. Thus, the natural gas transmission companies are extremely interested in obtaining exceptionally accurate measurements to determine their contractual liability to the suppliers of natural gas as well as to transmit an accurate quantity of this gas to the ultimate user. Thus, it may be seen that even an increase in accuracy from 1% to 0.1% represents a considerable savings or loss, as the case may be, in the accurate sale and transmission of natural gas.

In the prior art, as illustrated by U.S. Pat. No. 3,537,312, flow measurements are made of absolute temperature, absolute pressure and turbine flow to provide an indication of volume in base terms of units of weight. The noted patent does recognize the various errors in the calculating circuitry to obtain this base measurement and suggests the use of a diode function generator to compensate for pressure transducer errors in accordance with density/pressure/temperature curves obtained experimentally. This patent notes that the apparatus as a whole obtains an accuracy within +1% or −1%. As seen from the discussion above, an accuracy to within but 1% would present a potential loss in the order of millions of dollars, and thus it is desired to obtain measurements of even greater accuracy.

In U.S. Pat. No. 3,701,280, the problem of translating measured gas flow at measured flow temperature and flow pressure, to obtain standard cubic feet at base temperature and pressures, is discussed. In this patent, it is noted that the volume at base conditions does vary from the Ideal Gas Law, i.e., that gas will vary in volume as a function of temperature and inversely as a function of pressure, by a deviation factor, i.e., the supercompressibility factor S. This patent goes on to note that it is quite complex to compute the supercompressibility factor and instead suggests that various predetermined functions of pressure, temperature and specific gravity may be used to calculate the deviation, i.e., the deviation with the supercompressibility factor S. In particular, these functions that are used to determine the supercompressibility factor S are approximated over limited, preselected ranges of pressure, of temperature and of specific gravity by taking values from the "Manual for Determination of Supercompressibility Factors for Natural Gas", PAR Research Projects NX-19, published by the American Gas Association, and using these values to determine the noted functions of temperature, pressure and gas. However, it is significant that such calculations are approximations and do not attempt to calculate specifically the exact values of the supercompressibility factor S in accordance with the equations (2) to (14) as set out above. This patent is illustrative of the current state of the art, wherein more sophisticated calculation techniques are used to obtain estimates of the supercompressibility factors and the overall accuracy of the calculations of the standard cubic feet $V_b$ of natural gas have been in the order of 0.1%.

SUMMARY OF THE INVENTION

It is therefore an object of this invention to provide an extremely accurate calculation of standard cubic feet of gas.

It is a more particular object of this invention to achieve a calculation of standard or base cubic feet in which no estimates or approximate values are used to obtain the supercompressibility factor, and each of the equations (1) to (14) as enumerated above are calulated to achieve a precise value of standard cubic feet with a precision in the order of 0.02%.

It is a still further object of this invention to provide a new and improved system for monitoring the measurements of line pressure, of line temperature, and line flow to calculate with high precision a value of standard cubic feet, and further, to provide a display of the aforementioned values as well as to check the operability of various parts of the calculating system and to provide alarm manifestations indicative of failure thereof, as well as electrical outputs (analog or digital) to give indications of base flow rate and of totalized base volume.

These and other objects in accordance with the teachings of this invention are met by a system including a transducer for measuring line or flow pressure of the gas flowing through a conduit, a transducer for measuring the line or flow temperature of the aforementioned gas, means in the form of a turbine meter for measuring the gas flow through the conduit, and calculation means for repetitively calculating with high accuracy base or standard cubic feet, wherein the supercompressibility factor is computed based upon values of measured gas temperature for specific entered values of measured gas temperature for specific entered values of specific gravity, mole percent of the gas pressure base, contract pressure base and meter factor, effecting a plurality of computing steps for each calculation of the base gas flow. During each step, an initially-approximated value of this compressibility factor or the previously-calculated value is used to obtain and display continuously an indication of the standard cubic feet, it being understood that each computer step is insufficient to recalculate the supercompressibility factor, this calculation taking a plurality of steps.

In one particular embodiment of this invention, a programmed microprocessor is utilized, requiring a plurality of repetitive computation cycles or steps to calculate a new value of the supercompressibility factor, which factor then is utilized to calculate with great accuracy and display a manifestation of the base or standard cubic feet for standardized conditions of temperature and pressure.

BRIEF DESCRIPTION OF THE DRAWINGS

These and other objects and advantages of the present invention will become more apparent by referring to the following detailed description and accompanying drawings, in which.

DETAILED DESCRIPTION OF THE PREFERRED EMBODIMENTS

Figure 1:
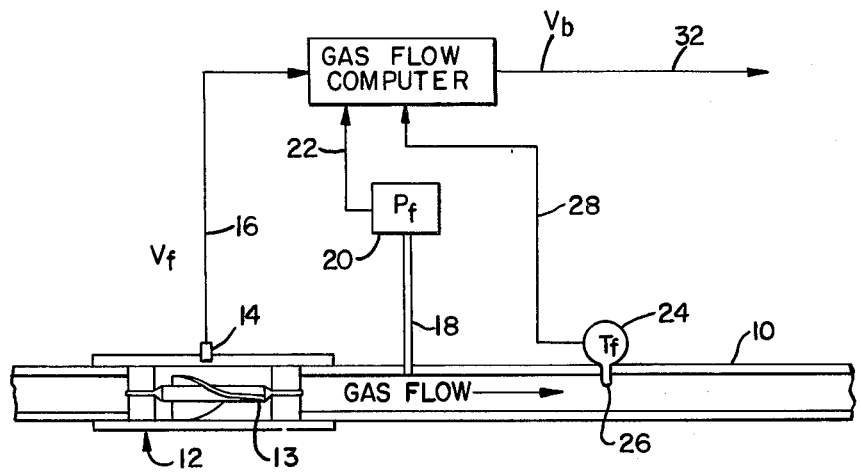
FIG. 1 is a schematic diagram showing generaly the computation of a standard or base cubic feet of gas flow, dependent upon inputs of uncorrected gas volume, gas temperature and gas pressure.
Figure 2:
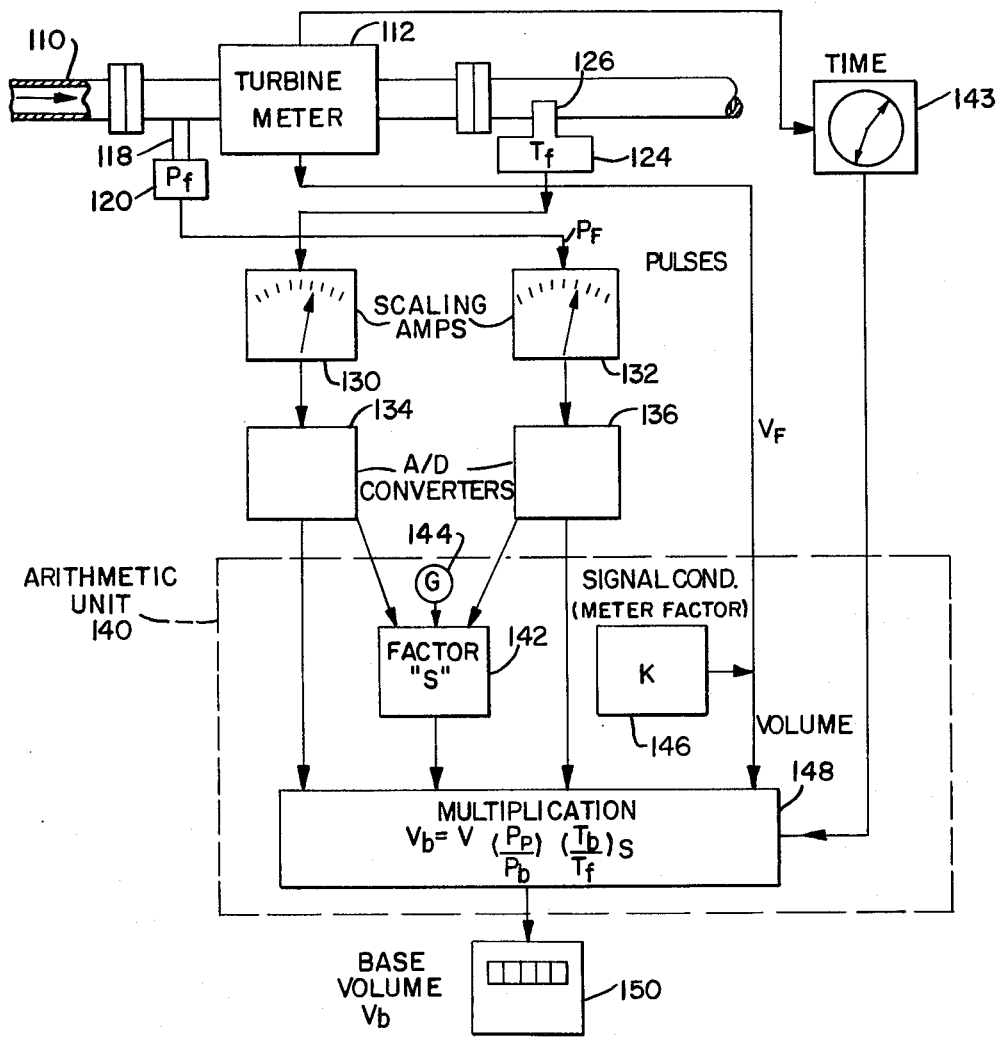
FIG. 2 is a general schematic diagram showing the process of calculating standard or base cubic feet wherein precise values of the supercompressibility factor S are calculated without approximation in accordance with the teachings of this invention.

Referring now to the drawings and in particular to FIG. 2, there is shown a functional block diagram of the system of this invention for providing a continuing manifestation of adjusted or base gas volume $V_b$ in terms of standard cubic feet. In particular, gas as directed under pressure through a conduit 110 is measured as to its line flow by a turbine meter 112 having a rotor that is driven by the gas flow and connected to a pulse generator therein to generate a train of pulses as a function of the rotor motion and therefore the gas flow. Thus, as seen in FIG. 2, the output of the turbine meter 112 is a series of pulses indicative of the line gas volume directed through the conduit 110. In an illustrative embodiment of the invention, the turbine meter 112 may be any of Rockwell's Mark II Turbometers including the T-18, T-30, T-60 or T-140 meter. In addition, the temperature of the gas directed through the conduit 110 is measured by a temperature measuring device 124 having a probe 126 inserted within the conduit 110. Illustratively, the temperature probe 126 may be a platinum resistance thermometer (RTD), such as manufactured by Senso-Metrics under their deisgnation Model No. 1001. In addition, the pressure of the gas flowing within the conduit 110 is measured by a solid state pressure transducer 120 that is coupled to the conduit 110 by a tube 118. The transducer 120 may illustratively be a solid state pressure transducer as manufactured by Senso-Metrics.

As indicated in FIG. 2, the outputs of the pressure transducer 120 and temperature sensing probe 126 are appropriately conditioned by scaling amplifiers 130 and 132, respectively, before being applied to the analog-to-digital converters 134 and 136, respectively. Further, the output of the turbine meter 112 is in the form of pulses whose rate is indicative of gas flow. As indicated by the following equation, the line flow of the gas $V_f$ is equal to the number of the pulses times a meter factor $K_1$ that is characteristic of the turbine meter 112:

$$V_f = (\text{Pulses})(K_1) \tag{15}$$

where $K_1$ = meter factor

The conditioning of the pulse train as derived from the turbine meter 112 in accordance with equation (15) is carried out by the signal conditioning circuit 146. Thus, input digital signals indicative of line or flow temperature $T_f$, line or flow pressure $P_f$ and gas flow $V_f$ are applied to an arithmetic unit 140 wherein equation (1) is solved as indicated functionally in block 148. In accordance with this invention, the supercompressibility factor S is calculated in accordance with equations (2) to (14), as set out above, as performed in block 142. In this regard, the specific gravity factor G indicative of the specific gravity of the particular gas flowing through conduit 110 is entered through input 144. The output of the arithmetic unit 140 is a manifestation of the base volume $V_b$ which has been adjusted to standard or base conditions of base pressure $P_b$ and base temperature $T_b$.

In addition, the base flow rate may be calculated similarly with respect to an indication of time as provided by clock 143, which provides a highly accurate time base reference for the microprocessor system. It is understood that FIG. 2 is a functional representation of the calculations carried out to calculate, without approximation, the base volume $V_b$ and in particular to provide a complete calculation of the supercompressibility factor S, which, as indicated by equations (2) through (14), is a complex factor to calculate.

Figure 3:
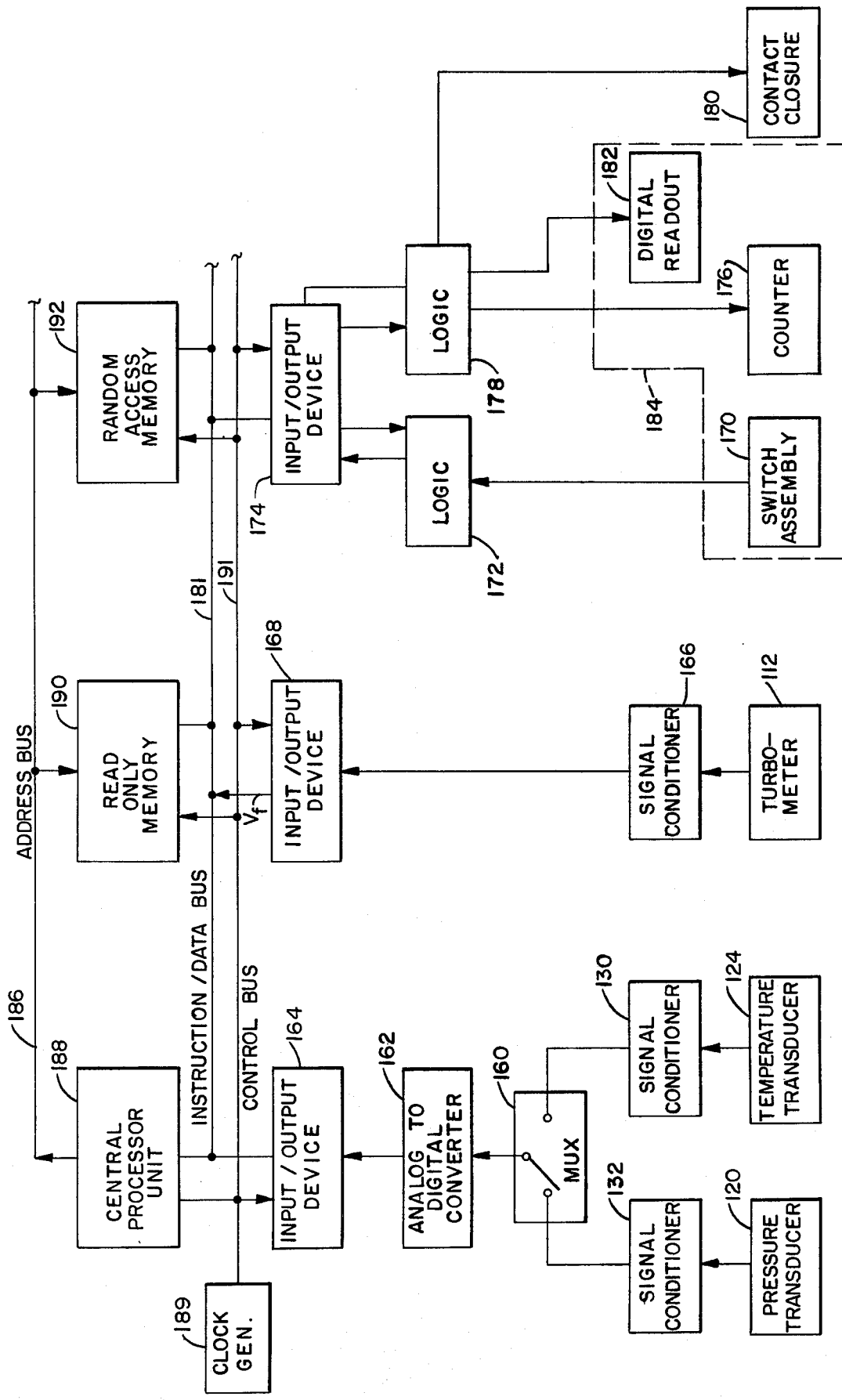
FIG. 3 is a more detailed diagram of a microprocessor in accordance with the teachings of this invention, for obtaining precise calculations of the supercompressibility factor S without approximation, and therefore precise values of standard cubic feet of gas volume, as functions of measured gas flow temperature and gas flow pressure, measured gas flow and entered values of specific gravity, mole percent, and pressure bases of the particular gas being measured.

With regard to FIG. 3, there is shown a digital computer for performing the complex calculations as required by equations (2) to (14). In particular, an indication of line or flow pressure $P_f$ is provided by the pressure transducer 120, line temperature $T_f$ by the temperature transducer 124, and line gas flow by the turbometer 112 in a manner similar to that described with regard to FIG. 2. The output of the pressure transducer 120 is conditioned by a signal conditioner 132 which performs the necessary scaling and amplifying steps before applying its adjusted output via a multiplexing switch 160 to an analog-to-digital converter 162. In similar fashion, the output $T_f$ of the temperature transducer 124 is conditioned by the signal conditioner 130 which scales and amplifies the transducer signal before applying same via the multiplexing switch 160 to the analog-to-digital converter 162. The signal conditioners 132 and 130 are well-known in the art. The digital output of the analog-to-digital converter 162, indicative of either the line temperature $T_f$ or line pressure $P_f$, is applied through a suitable, general-purpose input/output device 164 to an instruction/data bus 181. The general-purpose input/output device 164 is a standard multiplexing device, as manufactured by the assignee of this invention under their designation Rockwell International Parallel Processing System - GPI/O 10696.

Similarly, the pulse train output of the turbometer 112 is applied through a signal conditioner 166 that takes the form of a conventional digital logic gate such as that manufactured by Motorola and RCA under their designation of digital logic buffers, Type 14049. The conditioned pulses are applied to an input/output device 168 that performs interval timing functions and comprises four counters. In particular, a first counter counts the number of input pulses as derived from the turbometer 112. A further counter is provided to count the pulses of a densitometer, not shown in FIG. 3, but contemplated as an alternative embodiment wherein an indication of gas flow density is obtained and wherein the use of the pressure and temperature transducers may be avoided. The remaining two counters, in one illustrative embodiment, provide a time or interval basis within which to measure the number of pulses derived from the turbine meter 112. The output from the input/output device 168 is an indication of uncorrected gas volume $V_f$ and is applied to the instruction data bus 181.

Figure 4:
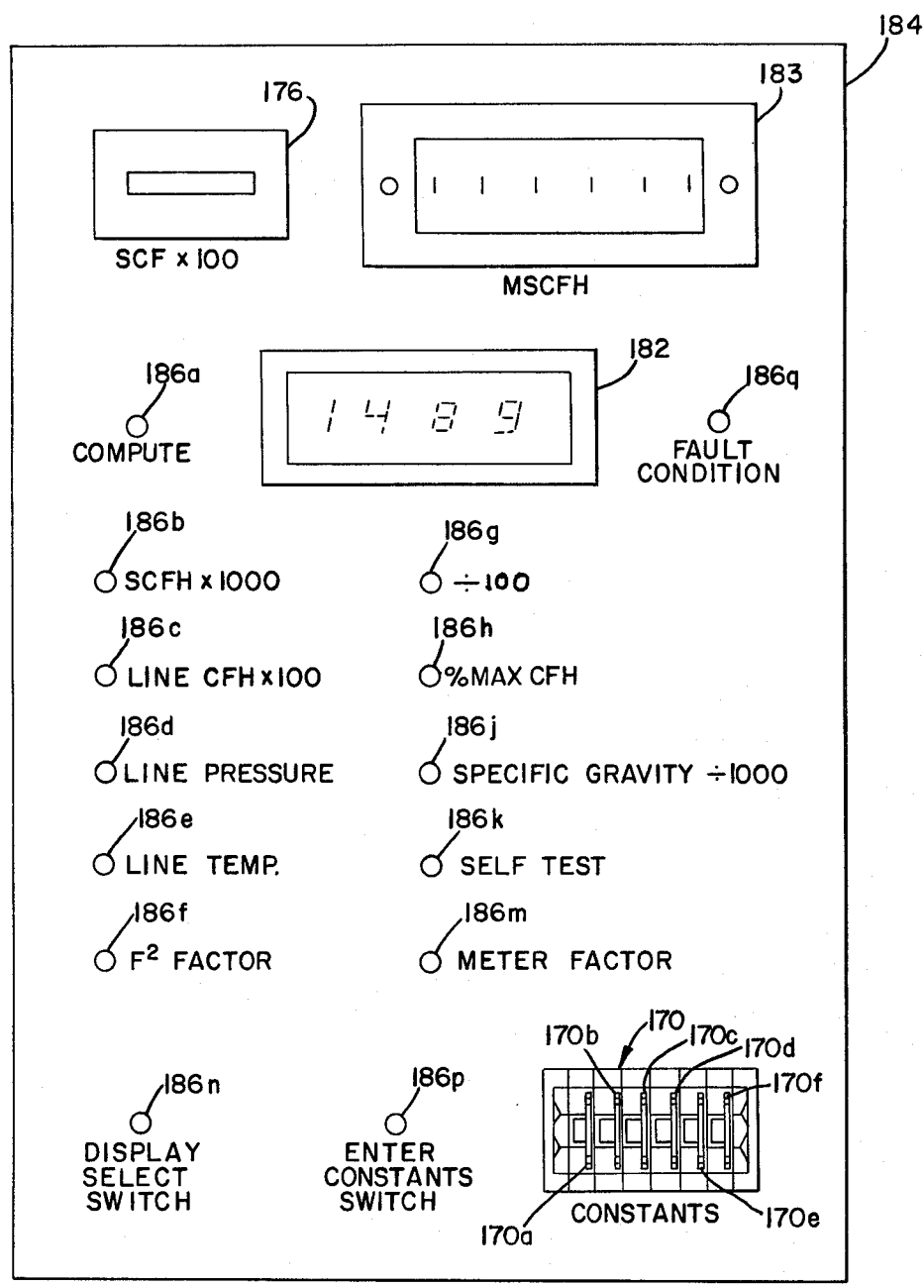
FIG. 4 is a showing of a display panel including switches for entering various constants and readouts for accurately displaying the measured values or the currently-calculated standard values of the gas flow.

As shown in both FIGS. 3 and 4, a control panel 184 is provided upon which the various gas flow variables and calculated manifestations of the adjusted gas volume in standard cubic feet are selectively displayed. In addition, there is provided means in the form of a thumbwheel switch assembly 170 for entering the various constants, such as the meter factor K and a value of the specific gravity of the gas flowing through the conduit 110, as well as the base or standard values of pressure $P_b$, temperature $T_b$ mole percents of $CO_2$ and $N_a$, and a configuration code (to be explained later). The constants entered through the thumbwheel switch assembly 170 are applied to a logic or multiplexing circuit 172, which takes the form in one illustrative embodiment of standard logic chips, as manufactured by the assignee of this invention under their designation CPI/O 10696. In turn, the input data is applied through a general-purpose input/output device 174 to the instruction data bus 181. The calculated values of standardized or base volume $V_b$, as well as an indication of the previously-stored values of the entered constants, are applied from the computation circuitry, to be explained, via the input/output device 178 to a totalizer or display device, taking the form of an electromechanical counter 176. Such an electromechanical counter 176 is a non-volatile device and if power is lost, the manifestation or indication of the standard of base gas flow $V_b$ will not be lost. In addition, as indicated in both FIGS. 3 and 4, a digital readout display 182 is provided for the digital readout of the various calculated values or entered constants. In addition, the logic circuit 178 is capable of receiving data from the input/output device 174 to be transferred through an assembly of contacts 180 whereby data may be transferred to a remote station.

As shown in FIG. 4, the control panel 184 provides a plurality of light-emitting diodes (LED's) 186 to identify the data that is being displayed upon the digital readout display 182. Thus, an operator may actuate a display-select switch 186n, whereby the display panel 184 is sequenced under the control of the computer to be explained, whereby an indication of the entered constants, measured conditions and calculated values, is displayed upon the digital readout display 182. In the illustrative embodiment shown in FIG. 4, upon actuation of the display select switch 186n, the LED's will be energized cyclically in sequence. During each compute cycle, the computer will interrogate the display panel to determine which LED 186 is lit, and will load the corresponding current value to be displayed upon the panel 184. Thus, the LED 186b is energized first to indicate that the showing upon the display 182 is that of the standard volume $V_b$ in terms of standard cubic feet per hour. Thereafter, displays of line flow in terms of cubic feet per hour as indicated by the LED 186c, line pressure $P_f$ by LED 186d, line temperature $T_f$ by LED 186e, the supercompressibility factor S ($F_p2$) by LED 186f, line density by LED 186g, percent of the maximum line flow by LED 186h, the entered value of the specific gravity constant G by LED 186j, and the entered value of meter factor constant K by LED 186m, are provided upon the display 182. Upon the occurrence of each cycle of the computer, the LED 186a will be energized. In addition, at designated times in each computation cycle, the computer will: (a) run a self test as indicated by the energization of the LED 186k, and (b) if a fault condition is detected, energize the LED 186q.

As shown in FIG. 4, the thumbwheel switch assembly 170 includes an array of six thumbwheels; the first thumbwheel switch 170a is actuated to select which constant is to be entered, e.g., the meter factor K, the specific gravity factor G, the standard pressure, the standard temperature, the mole percent of the gas constituents, and the configuration code. The actual value of the constant then is dialed into the thumbwheel switches 170b–170f and upon the actuation of the enter-constant switch 186p, the value of the constant so entered is applied via the logic circuit 172, the input/output device 174, to the instruction data bus 181.

As shown in FIG. 3, the calculations in accordance with equations (2)–(14) are performed under the control of a computer which in turn is controlled by a central processor unit 188. In an illustrative embodiment of this invention, the central processor unit 188 is that as manufactured by the assignee of this invention under their designation PPS-8 Central Processor Unit, and as more fully described in "Parallel Processing System (PPS) Data Sheet", Document No. 29000 D04-P/N11806, dated March, 1976. The central processor unit 188 implements the various programs and subroutines stored in its programmable read-only memory (ROM) 190 by applying suitable address signals via an address bus 186 to the read-only memory (ROM) 190, and to a random-access memory (RAM) 192. In an illustrative embodiment of this invention, the ROM 190 may take the form of a 4K ROM device, as manufactured by the assignee of this invention and as further described in their bulletin entitled "Application Note for 4K-ROM Device", P/N866, dated September, 1976, and the RAM 192 may illustratively take the form of a 256×8 random-access memory, as described in their bulletin entitled "Parallel Processing System (PPS) Data Sheet", Document No. 29000-D20-P/N11809, dated March, 1976. The main programs, including the initialization program and the computational programs, are stored in the ROM 190, which is a non-volatile memory. In turn, the RAM 192 provides in general terms a memory for the current values of flow pressure $P_f$ and flow temperature $T_f$, as well as the other values as displayed upon the control panel 184. As shown in FIG. 3, the gas flow computer further includes a clock generator 189 that applies clock signals via a control bus 191 to the central processor unit 188, to the read-only memory 190, the random-access memory 192, and the input/output devices 164, 168 and 174.

Figure 9B:
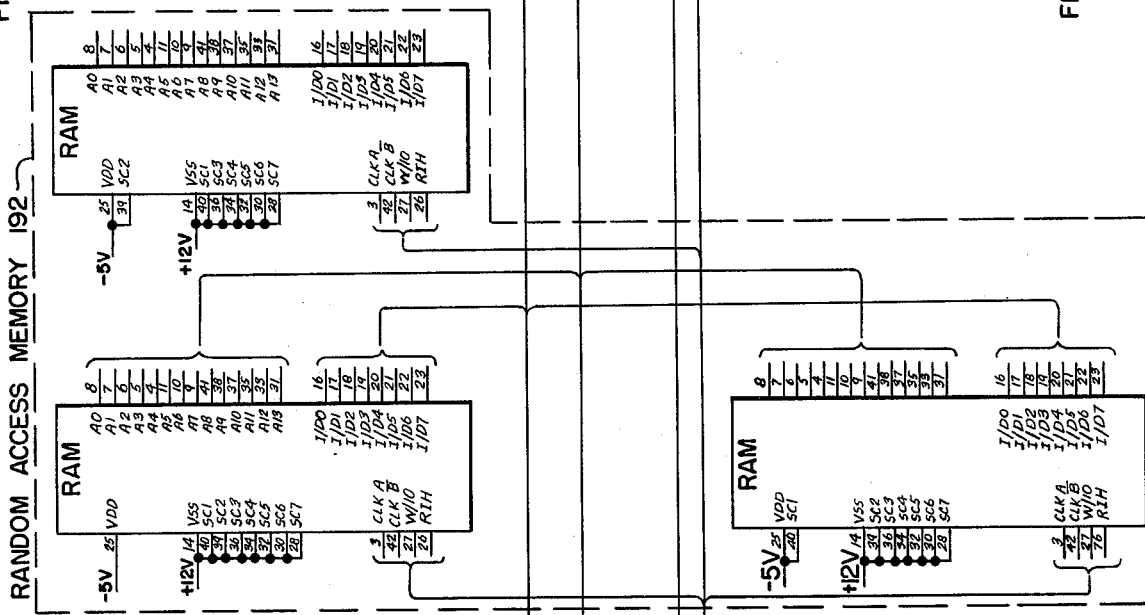
Figure 9A:
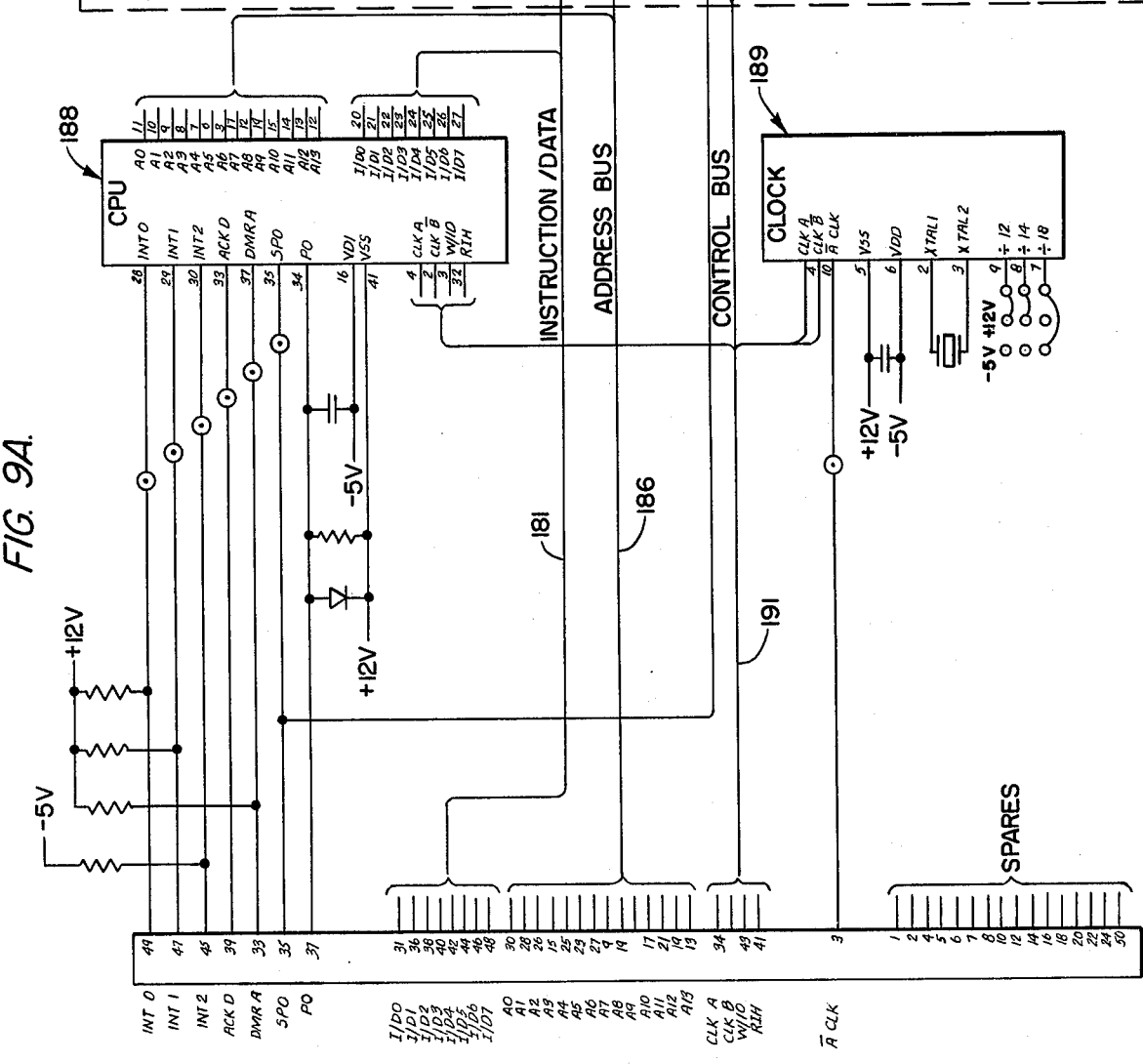

Referring now to FIGS. 9A and B, and 10A and B, there is shown the detailed circuit elements comprising a gas flow computer as schematically shown by the functional block diagram of FIG. 3. Referring now to FIG. 9A, there is shown that the ROM 190 is comprised of a plurality of PPS bus interface circuits illustratively taking the form of the logic circuits manufactured by the assignee of this invention under the designation No. 10738. In turn, the output of these PPS bus interface circuits are connected to data buffers as shown in FIG. 9B, which are in turn connected to a plurality of PROM logic circuits as manufactured by Intel or Motorola under the designation No. 2708. As seen in FIG. 9A, the instruction/data bus 181 and the address bus are connected to the ROM 190 and the CPU 188. In turn, a clock circuit 189 as manufactured by the assignee of this invention under their designation No. 10706 is interconnected with the CPU 188.

Referring now to FIG. 10A, there is shown the signal conditioner 166 which is connected to the turbometer 112 to provide a conditioned signal indicative of the turbometer output via the input/output device 168 to the instruction/data bus 181, which is in turn connected to each of the CPU 188, ROM 190 and RAM 192, as shown in FIG. 3. Further, the temperature transducer 124 is connected to the signal conditioner 130, and the pressure transducer 120 is connected to the signal conditioner 132; the outputs of signal conditioners 130 and 132 are connected to the multiplexer 160. The output of the multiplexer 160 is connected to the A/D converter 162 comprised of two logic circuits as manufactured by Motorola under the designation Nos. 14435 and 1505.

As shown in detail in FIGS. 10A and B, the output of the A/D converter 162 is applied to the input/output device 174, which is comprised of two logic circuits 174a and 174b. Further, the input/output device 164 as shown in FIG. 3 and a part of the input/output device 174, i.e. 174a, comprise a single logic circuit, as manufactured by the assignee of this invention under their designation No. 19696. An output is derived from the logic circuit 174a and 164 and is applied via a logic circuit 172 (see FIG. 10A) to the thumbwheel array 170, whereby constants and other values may be entered into the memory of the system. Further, an output is derived from the input/output device 174a and is applied via a logic circuit 178 to the counter 176. As illustrated in FIGS. 10A and B, the input/output devices 174a and 164, and 174b are interconnected by the instruction data bus 181. An output is derived from the input/output device 174b and is applied via the logic circuit 178 to the digital display 182, comprised of a plurality of logic circuits (illustratively a circuit designated MC14511 as manufactured by Motorola) for selecting one of the LED's 186 to be energized and actuating a driver circuit and appropriate amplifiers for energizing the selected LED 186.

GENERAL DESCRIPTION OF COMPUTER PROGRAMS

There are essentially two programs or routines that are executed by the computer system and stored particularly in the ROM 190, i.e. the POWER ON/INITIALIZATION routine and the REPETITIVE COMPUTE CYCLE routine. As its name implies, the POWER ON/INITIALIZATION program is entered as power is applied to the computer system and prepares the various circuits and elements of the computer system prior to entering the REPETITIVE COMPUTE CYCLE routine, wherein the calculations necessary to solve the equations (1) to (14) are performed. Assuming that the various transducers 120, 124 and 112 have been connected appropriately to the computer system, the POWER ON/INITIALIZATION routine will be initiated upon the application of line voltage.

To initiate the calculations as performed by the REPETITIVE COMPUTE CYCLE routine, the computer searches for a valid configuration code, and, if available, begins calculating using nominal values for constants. In order to enter such constants, the constant-select, thumbwheel switch 170a, as shown in FIG. 4, is set to the desired constant to be entered, and its value, within specified limits, is entered upon the remaining thumbwheel switches 170b–170e. At that time, the enter-constant switch 186p is depressed, whereby the computer will respond by blinking twice both the FAULT and COMPUTER LED's 186a and 186n. If no response is given, there is an indication that the entered constants are out-of-range or the select-digit, thumbwheel switch 170a is addressing a vacant constant. The above steps are repeated until the required constants are entered.

After the completion of the POWER ON/INITIALIZATION routine and the entry of all necessary constants, the REPETITIVE COMPUTE CYCLE routine is executed automatically by the central processor unit 188. In an illustrative embodiment of this invention, the REPETITIVE COMPUTE CYCLE routine requires 7.2 seconds to run and is repeated as long as the computer is permitted to operate. First, the number of pulses in the pulse train derived from the turbometer 112 is accumulated and a check is made to verify the existence of the pulse train. If no pulses are detected during any computer cycle, an indication thereof and a flag is initiated to energize the FAULT condition LED 186n, which will remain energized until this condition is corrected. Next, the input signals from the pressure transducer 120 and temperature transducer 124 are checked to verify the connection of these transducers. If one or both are missing, the FAULT condition LED 186q also will be energized intermittently, once per compute cycle, until corrected. If connections are verified to the transducers 120 and 124, each transducer is interrogated and their respective quantities digitized by the analog-to-digital converter 162, scaled and stored within the RAM 192. Next, the turbine pulse counter within the interval timer, input/output device 168 is reset, and a complete volume calculation using the latest input values is carried out, i.e., the calculations according to equation (1) are performed. As long as the REPETITIVE COMPUTE CYCLE routine continues to run, the COMPUTE LED 186a is flashed.

A significant advantage of this invention is that it permits continuous display of the various values being measured and/or calculated, upon the control panel 184. In particular, during each execution of the REPETITIVE COMPUTE CYCLE routine, the rate output is updated to provide an indication of the adjusted or base gas volume $V_b$, and if enough accumulated flow has occurred within the previous cycle or cycles, the electromechanical counter 176 is pulsed. The computer functions to calculate continuously the base gas flow $V_b$, even though the electromechanical counter 176 is not energized during a given cycle; only when a sufficient gas flow $V_b$ has been accumulated, will the counter 176 be energized incrementally. If during a given cycle the display select switch 186n is actuated, the routine determines which quantity corresponding to any of the base flow rate, line flow, line pressure, line temperature, supercompressibility factor, line density, percentage of maximum flow, specific gravity, self test or meter factor is to be displayed and then controls the display of the selected value upon the digital display 182.

A significant aspect of this invention involves the calculation, without approximation, of the supercompressibility factor S in accordance with equations (2) to (14), given above. As a result, the solution of these equations involves a significant number of mathematical processes, requiring in one illustrative embodiment of this invention, five COMPUTE cycles, each of 7.2 seconds, for a total time of 36 seconds, though the actual computation time for the factor S may require only 19 seconds. In the first of the five COMPUTE cycles, values of pressure and temperature obtained from the transducers 120 and 124 are used. During the initial five REPETITIVE COMPUTE CYCLE routines that are required to compute the supercompressibility factor S, a nominal value based on the Pressure Range selected from the configuration code, is substituted for the supercompressibility factor S in the calculation of equation (1). During the subsequent executions of the REPETITIVE COMPUTE CYCLE routine, the previously-calculated value of the supercompressibility factor is entered so that a value of adjusted or base gas volume $V_b$ may be displayed continuously.

Further, a check is made to determine if the enter constant switch 186p was actuated and if so, the preselected values as entered via the thumbwheel switch 170 is entered and the COMPUTE and FAULT LED's 186a and 186q, respectively, are energized to acknowledge entry of the new constant, which then is used in future calculations.

Once during each REPETITIVE COMPUTE CYCLE, the electromechanical counter 176 is updated, if required. Whether the counter 176 is updated or not depends upon the previously-accumulated volume that has been computed and stored within the RAM 192. There is a minimum quantity that is displayed upon the counter 176, typically standard cubic feet 1,000 or 10,000 (SCF) so that if a lesser amount is accumulated during a previous cycle or cycles, no count will occur during that computer cycle. It is only when an amount, illustratively above 1,000 or 10,000 SCF, is accumulated, that the totalizer 176 will be energized or incremented. If, for example, more than the minimum count or value is accumulated during the past cycle, the RAM 192 stores the excess accumulation for the next cycle or cycles. It is significant that no calculated volume is ever lost and that even if there is a power failure, the electromechanical counter 176 will continue to display the previously-accumulated total base gas volume $V_b$.

During each REPETITIVE COMPUTE CYCLE, the computer will test to determine whether the display-select switch 186n has been pressed. If so, each value entered, detected or measured corresponding to the LED's 186b to 186m will be sequentially displayed upon the digital display 182. After the tenth LED 186m is energized corresponding to the meter factor, the next value displayed will correspond to the base volume flow. As indicated in FIG. 4, the displayed values have a fixed decimal place; as a result, the values have specific multipliers or dividers to scale the value to its proper range. There is no round-off on the displays, with accuracy being preserved to ten significant digit figures, with the most significant four digits being displayed at full multiplier value.

There is a self-test position corresponding to the LED 186k, which, upon being energized, will test the major components of the computer system as indicated in FIG. 3. If the components check out, an appropriate value, e.g. 8888, will be displayed upon the digital display 182. The fault test will check to determine whether the pulse train is received from the turbometer 112, whether outputs are received from the pressure transducer 120 and the temperature transducer 124, and whether there is a zero pressure condition within the conduit 110. In an illustrative embodiment of this invention, an absence of the pulse train from the turbometer 112 is indicated by continuous energization of the FAULT CONDITION LED 186q, and further all quantities requiring an output from the turbometer 112 will indicate "0", i.e. SCFH, LINE CFH, % Max CFH and the rate output. In the absence of an output from the temperature transducer 124 or the pressure transducer 120, the FAULT CONDITION LED 186q will blink and the quantities requiring outputs of pressure or temperature are displayed upon the digital display 182 as "0", i.e. SCFH, LINE CF, % Max CFH, the rate output, and either LINE PRESSURE or LINE TEMPERATURE.

Figure 5:
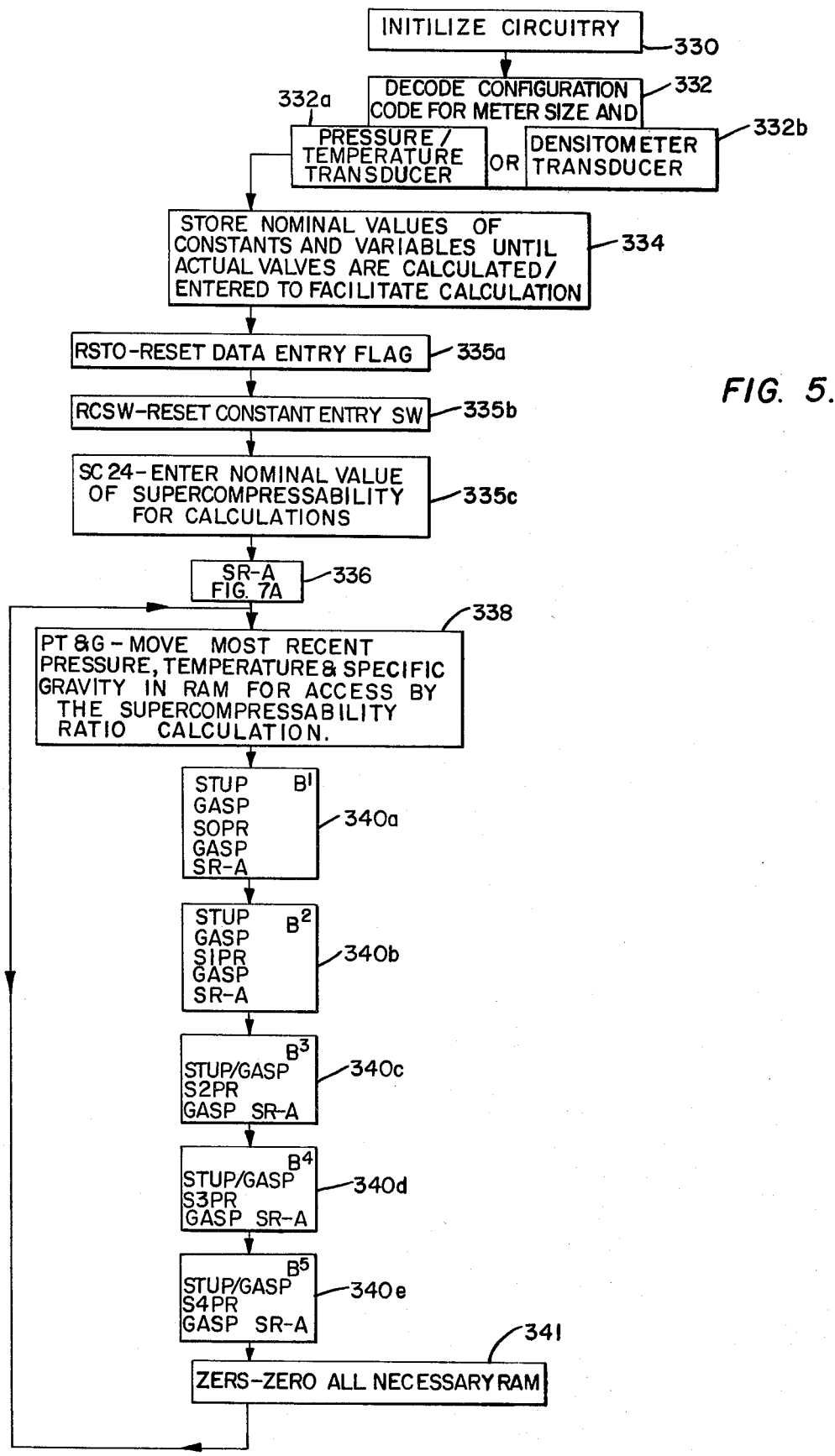
FIG. 5 is a high-level flow diagram of the steps for initializing the computer or microprocessor as shown in FIG. 3, i.e., the INITIALIZATION routine, and the steps for calculating the base gas volume including the supercompressibility factor, i.e., the REPETITIVE COMPUTE CYCLE routine.

FIG. 5 is a high level flow diagram of the complete program stored in the ROM 190, including an illustration of both the INITIALIZATION routine for initializing the computer and the REPETITIVE COMPUTE CYCLE for performing the calculations in accordance with the control procedures of this invention. First, as indicated in FIG. 5, the various elements of the circuitry are initialized by the INITIALIZATION routine, generally indicated in block 330. A lower-level description of the INITIALIZATION routine will be provided below with respect to FIGS. 6A and 6B. In particular, the memory locations of the RAM 192 are set to a high level and the memories in terms of flip-flops associated with the DISPLAY SELECT switch 186n, the ENTER CONSTANT switch 186p and the thumbwheel switch array 170 are set to known values, e.g. zero. Next, the input/output devices 164, 168 and 174 are placed in an initialized condition and synchronized to the system clock 189 under the control of the central processing unit 188. Further, the input/output device 174 associated with the counter 176 and the digital display 182 is conditioned by inserting appropriate multiplying factors so that the various values corresponding to the values calculated and measured corresponding to the LED's 186b to 186m, may be displayed cyclically upon the digital display 182 and the counter 176. Thereafter, the INITIALIZATION routine moves to step 332, to decode the configuration code as entered into the thumbwheel switch assembly 170 to determine whether the system employs a pressure and a temperature transducer 120 and 124, as shown in FIG. 3, or whether an alternative embodiment including a densitometer is incorporated. If, as shown in FIG. 3, a pressure transducer 120 and a temperature transducer 124 are incorporated, the INITIALIZATION routine branches to step 334, wherein nominal values of the meter factor constant and the specific gravity factor, as well as initial or nominal values of the variable such as pressure, temperature and flow are entered until actual values thereof can be calculated, by the REPETITIVE COMPUTE CYCLE routine as shown in FIG. 5 as steps 336 to 340e. After step 334, a RESET DATA ENTRY FLAG is set in step 335a, and thereafter, the thumbwheel switch array 170 is reset in step 335b in order to initiate the calculation of the supercompressibility factor S; in particular, a nominal value of the supercompressibility factor S is derived for use in step 336, wherein a value of the adjusted or base gas volume $V_b$ is calculated. In the initial configuration code RANGE OF PRESSURE is selected for the calculations. In subsequent steps, the value of the supercompressibility factor S as derived from the previous calculation is chosen and is entered in a suitable position in the RAM 192 to be readily available for the calculations performed in step 336.

Figure 7A:
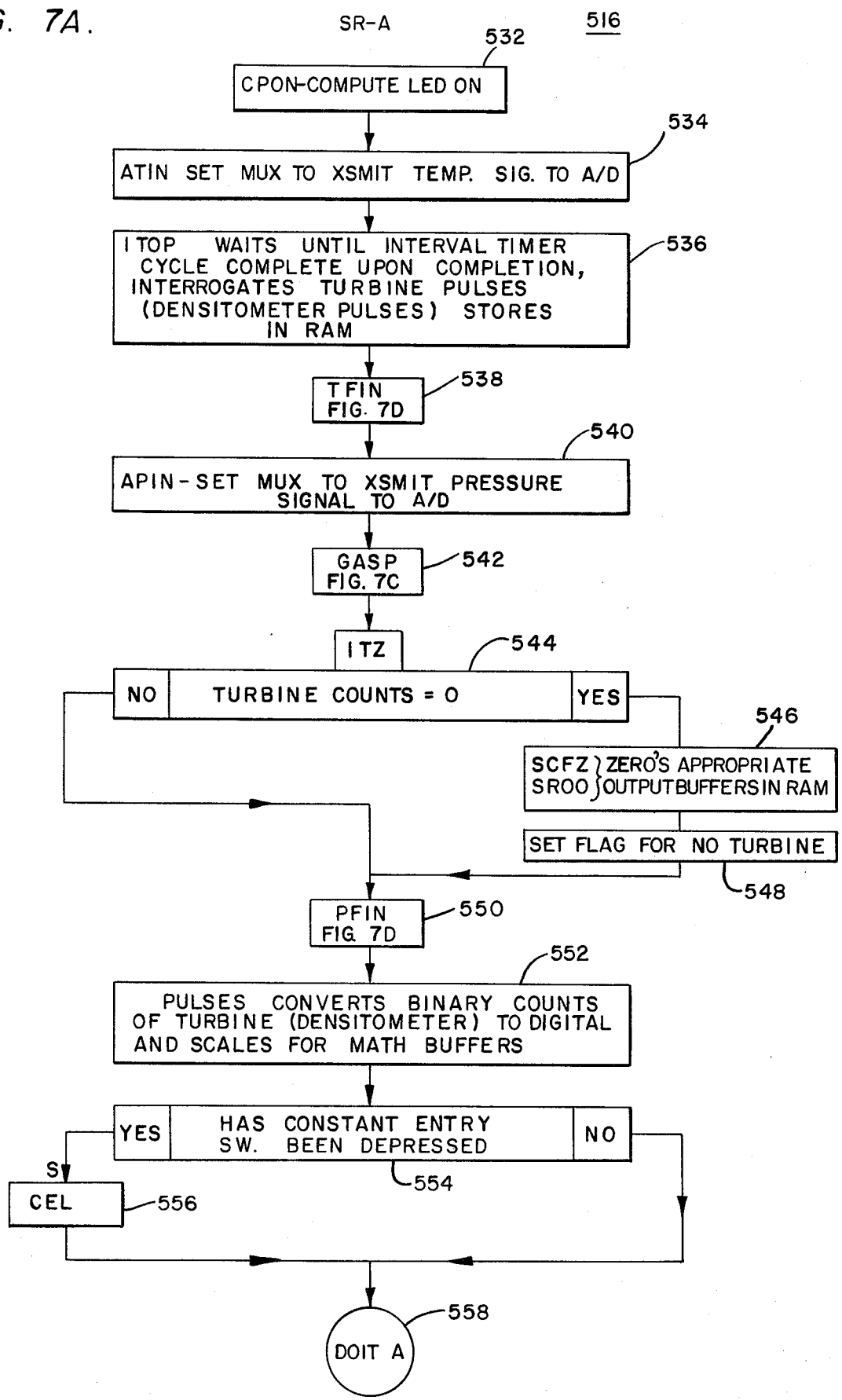
FIGS. 7A–7M show detailed flow diagrams of the various subroutines incorporated within the REPETITIVE COMPUTE CYCLE routine as generally shown in FIG. 5.

The REPETITIVE COMPUTE CYCLE program includes subroutine SR-A of block 336, more specifically shown in FIG. 7A, wherein generally, a value of the base gas volume is calculated in accordance generally with equation (1) set out above. Thereafter, in step 338, the most recent values of measured pressure and temperature from the pressure and temperature transducers 120 and 124, the entered value of specific gravity, and the mole percentages of $CO_2$ and nitrogen of the gas directed to the conduit 110 are stored in RAM 192 for the subsequent calculations of the supercompressibility factor S. As indicated generally in FIG. 5, the calculation of the supercompressibility factor S is carried out illustratively in five different serially-related calculations $B_1$ through $B_5$, as shown in blocks 340a to 340e. In each such step B, a partial calculation of the supercompressibility factor S is obtained and at the same time, a calculation of the adjusted or gas flow is obtained based upon the previously-calculated value of the supercompressibility factor S or upon an approximate value thereof in the case where it is the first such calculation carried out by the computing program.

As seen in FIG. 5, the subroutines $B_1$ of block 340a to $B_5$ of block 340e each are made up of further subroutines STUP, GASP, S0PR, S1PR, S2PR, S3PR, S4PR and SR-A. These subsequent routines will be explained with respect to FIGS. 7A to 7K. After the completion of the subroutine $B_5$ of block 340e, a conditioning step 341 is performed whereby those portions of RAM 192 associated with the intermediate calculations of the supercompressibility factor S are set to zero, before returning the program to step 338, as indicated in FIG. 5.

INITIALIZATION ROUTINE

Figure 6A:
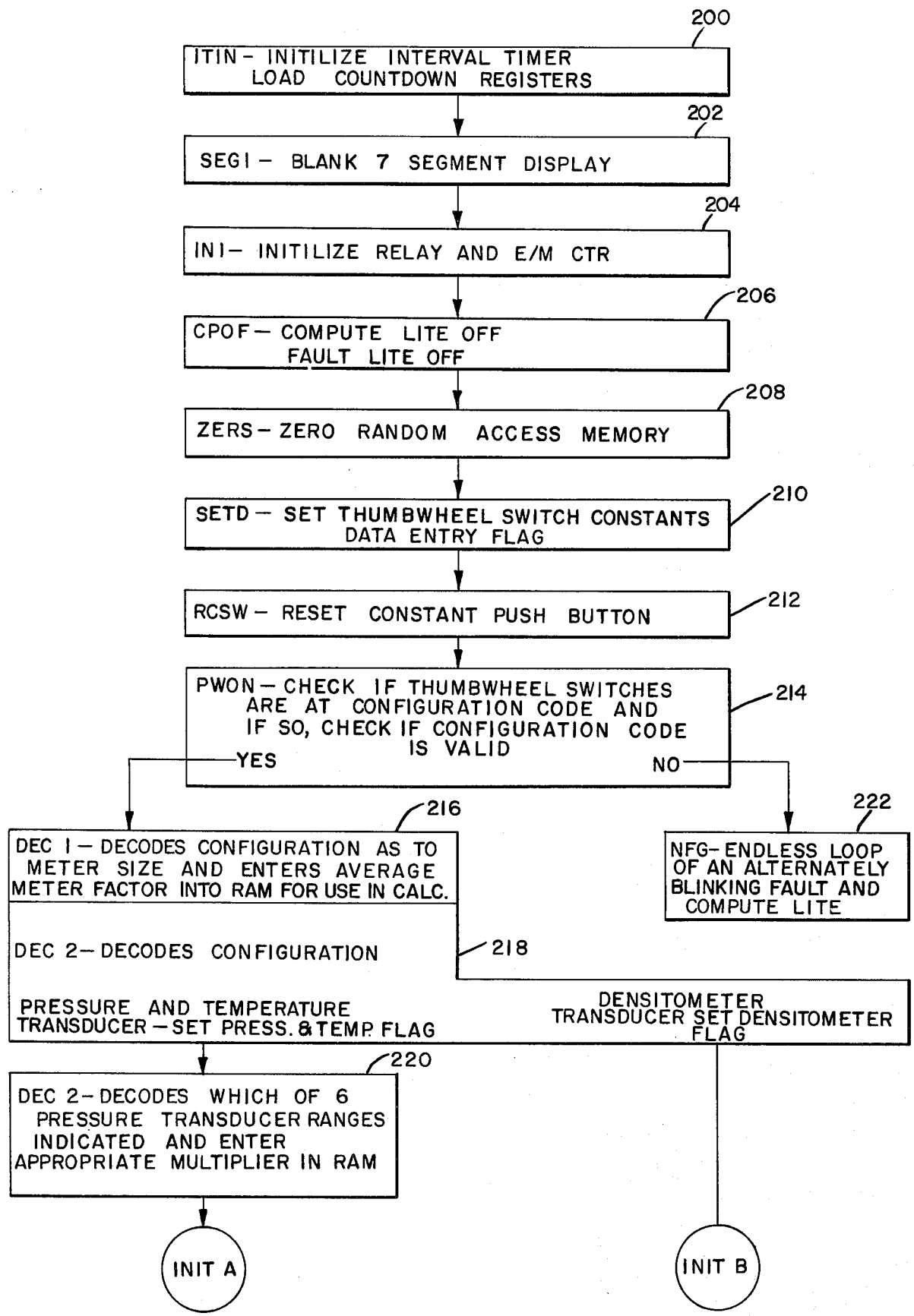
FIGS. 6A and 6B are detailed flow diagrams of the INITIALIZATION routine, as generally shown above in FIG. 5.

A more detailed explanation of the INITIALIZATION routine with respect to FIGS. 6A and 6B will be given. In FIG. 6A, the ITIN step 200 is executed to set or load countdown registers or counters of the interval timer of the input/output device 168. Next, the SEGI step 202 effects a blanking of the 7-segment digital display 182. Next the IN1 step 204 initializes the relay 180, closing its contacts to a remote station and the electromechanical counter or totalizer 176 is conditioned. Next, step 206 turns off the COMPUTER LED 186a and the FAULT CONDITION LED 186q. The ZERS step 208 erases or zeros the RAM 192 to prepare it to receive input data, including the entered constants. Next, the SETD step 210 sets a flag indicating that the thumbwheel switch assembly 170 is set to receive the entry of the constants, e.g. meter factor and specific gravity, etc. Thereafter, step RCSW 212 resets the memories or flip-flops associated with the ENTER CONSTANTS switch 186p. Thereafter, the step PWON 214 determines whether the thumbwheel switch 170a is set to receive at a configuration code and if so, if the entered configuration code (upon the remaining thumbwheel switches 170b-170f) is valid. If an appropriate configuration code has not been entered, a decision is made and the routine is branched to step NFG 222, wherein the FAULT CONDITION LED 186q and the COMPUTE LED 186a are alternatively energized. On the other hand, if an appropriate configuration code is entered, the routine is branched to DEC1 step 216 which decodes the entered configuration code to determine the size of the turbometer 112 and to store the previously-entered average meter factor into the RAM 192 for further calculations. Thereafter, DEC 2 step 218 decodes the configuration codes as to whether the system utilizes pressure and temperature transducers 120 and 124 or a densitometer (not shown). If the configuration indicates that a system configuration using the pressure and temperature transducers 120 and 124 is being utilized, the routine branches to step (DEC 2) 220, wherein step 220 decodes which of six pressure transducer ranges is indicated to enter in the RAM 192 the appropriate multiplier to achieve a display upon the digital display 182 of the value of line pressure.

Figure 6B:
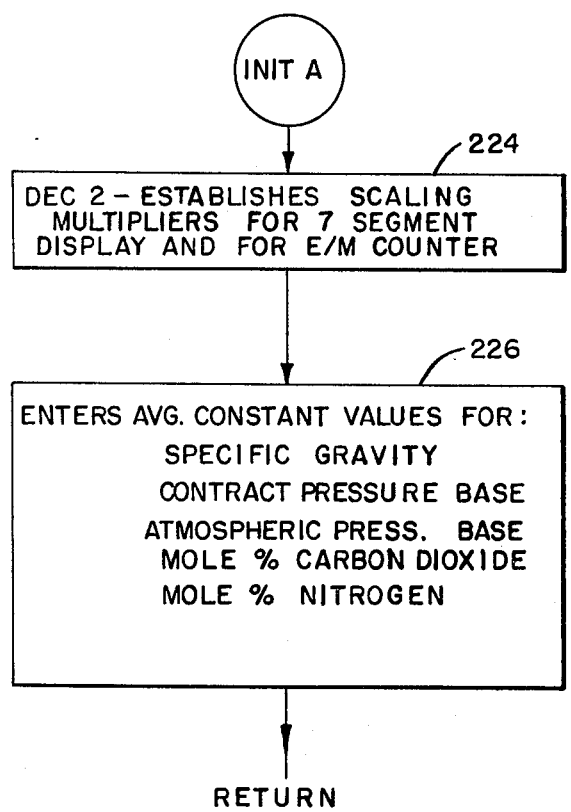

In this branch to subroutine INIT A, step 224 as shown in FIG. 6B is performed next, wherein the scaling multipliers for the 7-segment digital display 182 and for the counter 176 are stored in the RAM 192 to ensure that the four most significant digits are displayed upon the digital display 182. A nominal factor S is chosen based on range of pressure. Next, step 226 enters the average constant value in RAM 192 for the specific gravity, the contract or standard value of pressure $P_b$, an indication of atmospheric pressure, and the percent moles of carbon dioxide and nitrogen of the gas directed through the conduit 110. Thereafter, the INITIALIZATION routine is completed. It is contemplated that if in step 218 a densitometer is used within the system of FIG. 3, a separate routine, similar to that described with respect to FIG. 5B, would be executed to set the appropriate ranges for the output of such a densitometer as well as to enter the various values in a manner similar to that of step 226.

REPETITIVE COMPUTE CYCLE ROUTINE

The subroutine SR-A (generally indicated in FIG. 5) of the REPETITIVE COMPUTE CYCLE routine is more fully explained with respect to FIG. 7A. Initially, step 532 energizes the COMPUTE LED 186a. Next, step 534 sets the switch or multiplexing unit 160 to transmit the signal from the temperature transducer 124 via the signal conditioner 130 to the analog-to-digital converter 162. In a subsequent step, the current interval, as timed by the input/output device 168, is permitted to be completed, at which time the output pulse train as derived from the turbometer 112 and as stored in the counters of the input/output device 168 is interrogated and is stored in the RAM 192. Thereafter, the subroutine TFIN of block 538, as more specifically shown in FIG. 7D, is carried out to transfer data from the temperature transducer 124 to a designated area in the RAM 192. Thereafter, in step 540, the multiplexer 160 is set to transmit data from the pressure transducer 120 via the signal conditioner 132 to the A/D converter 162. At this point, a service subroutine GASP of block 542, as more fully shown in FIG. 7C, is actuated if the display select switch 186n is actuated to detect which data is to be displayed and to display its most current value. At this point in the routine, step 544 checks to determine whether a pulse train is being derived from the turbometer 112. If the count as obtained in one of the counters of the input/output device 108 equals zero, i.e. the absence of a pulse train, the routine is branched to step 546, wherein the designated area or buffer in the RAM 192 is conditioned by being set to zero and thereafter, a flag is set by step 548 to indicate that no turbine output is detected. Thereafter, the subroutine PFIN of block 550, as more specifically shown in FIG. 7D, wherein the output of the pressure transducer is transmitted from the A/D converter 162 to a designated area in the RAM 192.

Upon completion of step PFIN, step 552 accesses and converts the count data as stored in the counters of the input/output device 168, converting the count data to digital information, scaling it, before transferring it via the bus 181 to a designated portion of the RAM 192 identified as the "math buffers", as addressed by the central processor unit 188. The math buffers store data in preparation for later calculations. Next, a check is made in step 554 to determine whether the constant entry switch 186n has been depressed and if so, the subroutine CSEL 556 is performed whereby the constant, either the meter factor, the specific gravity factor, the mole percents or the pressure bases, as entered upon the thumbwheel switch assembly 170, is transfered into a designated area of the RAM 192. Thereafter, the routine is transferred to point 558.

Figure 7B:
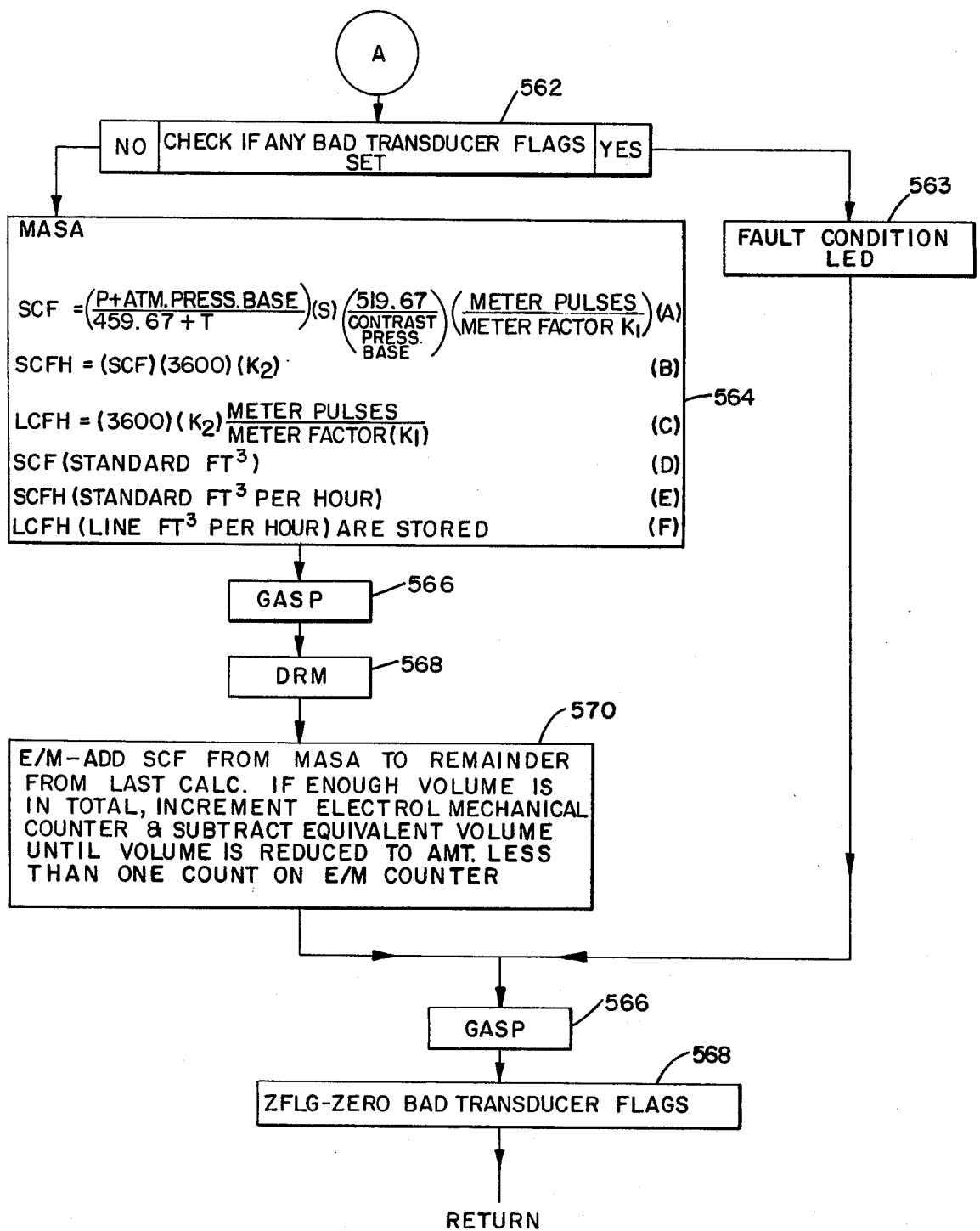
Figure 7C:
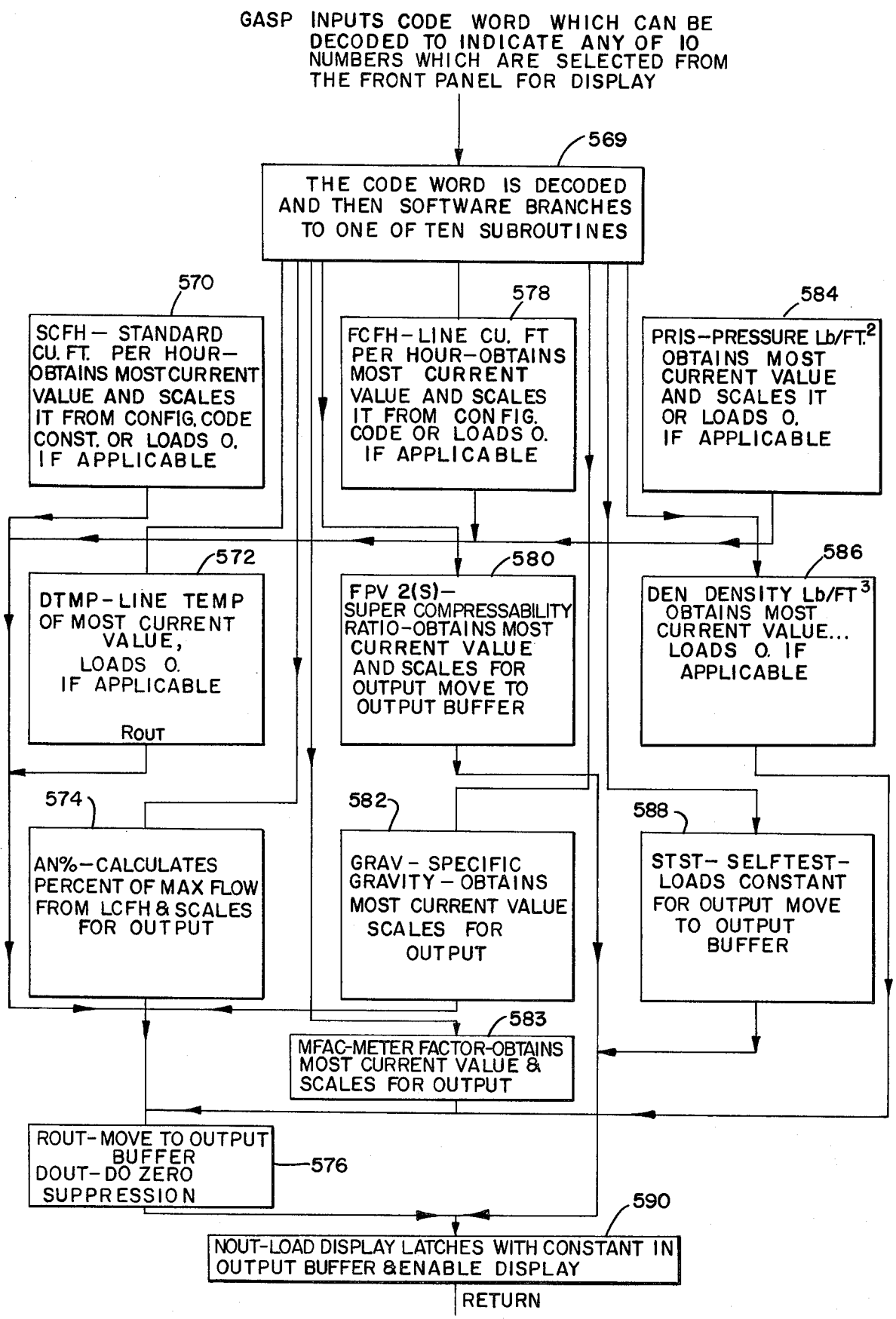
Figure 7D:
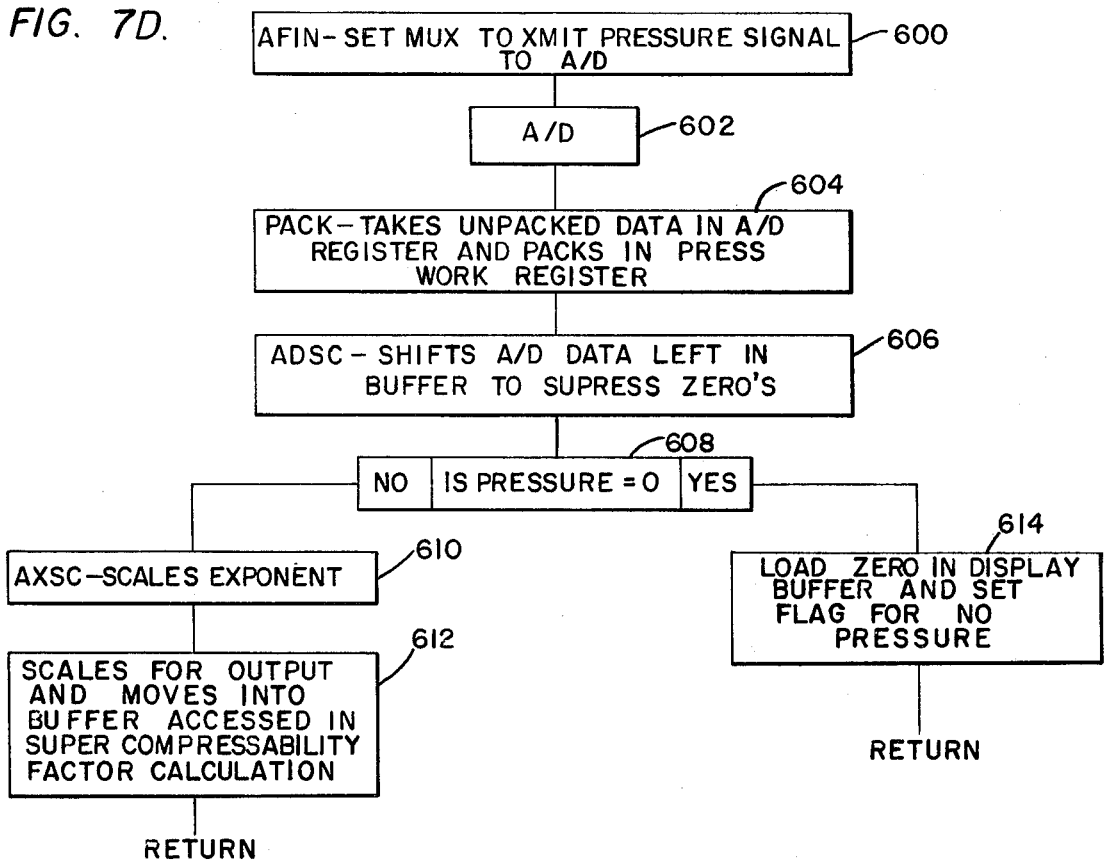

If the check step 554 indicates that the enter constant switch 186p has not been entered, the routine is directed to entry point 558, as shown in FIG. 7B, wherein a check step 562 is conducted to determine if either of the pressure transducer 120 or the temperature transducer 124 is defective and if so, step 563 energizes the fault condition LED 186q on the display panel 184. If check step 562 determines that the transducers 120 and 124 are operative, the routine proceeds to the calculations routine MASA of block 564 wherein the standard cubic feet and the standard cubic feet per hour are calculated. It is necessary to use a factor $K_2$ as indicated in equation (B) of block 564 to convert standard cubic feet as derived based upon a measurement over an interval of a computation cycle, e.g. 7.2 seconds, to an hourly basis. In addition, line or uncorrected cubic feet per hour also is calculated in accordance with equation (C) of block 564. Thereafter, values of standard cubic feet, standard cubic feet per hour, and line or uncorrected cubic feet per hour are stored in appropriate portions of the RAM 192. Next, the GASP subroutine, as more fully explained with respect to FIG. 7C, is performed to transfer the most current values of each of the measured or calculated values or constants and to store them in an appropriate output buffer area of the RAM 192 to permit ready access for the display of such information. The GASP subroutine also decodes the entered code word and selects one of the plurality of LED's 186 to be energized to identify the value being displayed by the displays 182. Thereafter, a subroutine DRM, as indicated in block 568, is carried out, wherein data is supplied to a logic circuit not shown which provides a digital (0–40 Hz) or analog (4–20 ma) signal indicative of desired factor SCFH. Thereafter, step 570 adds the value of the standard cubic feet as obtained from the last MASA routine 564 to the remainder as derived from the last cycle or cycles. Step 570 also checks to see whether there is sufficient accumulated standard cubic feet to increment the electromechanical counter 176 and upon incrementation thereof, the value at which the counter 176 was incremented is subtracted from the stored value until less than one count or incrementation remains in the designated area of the RAM 192. Again, at this point, the GASP routine as shown in step 566 is conducted. Thereafter, step 568 removes any bad transducer flags that were raised by step 563, and the A subroutine SR-A is completed and returned.

Figure 8:
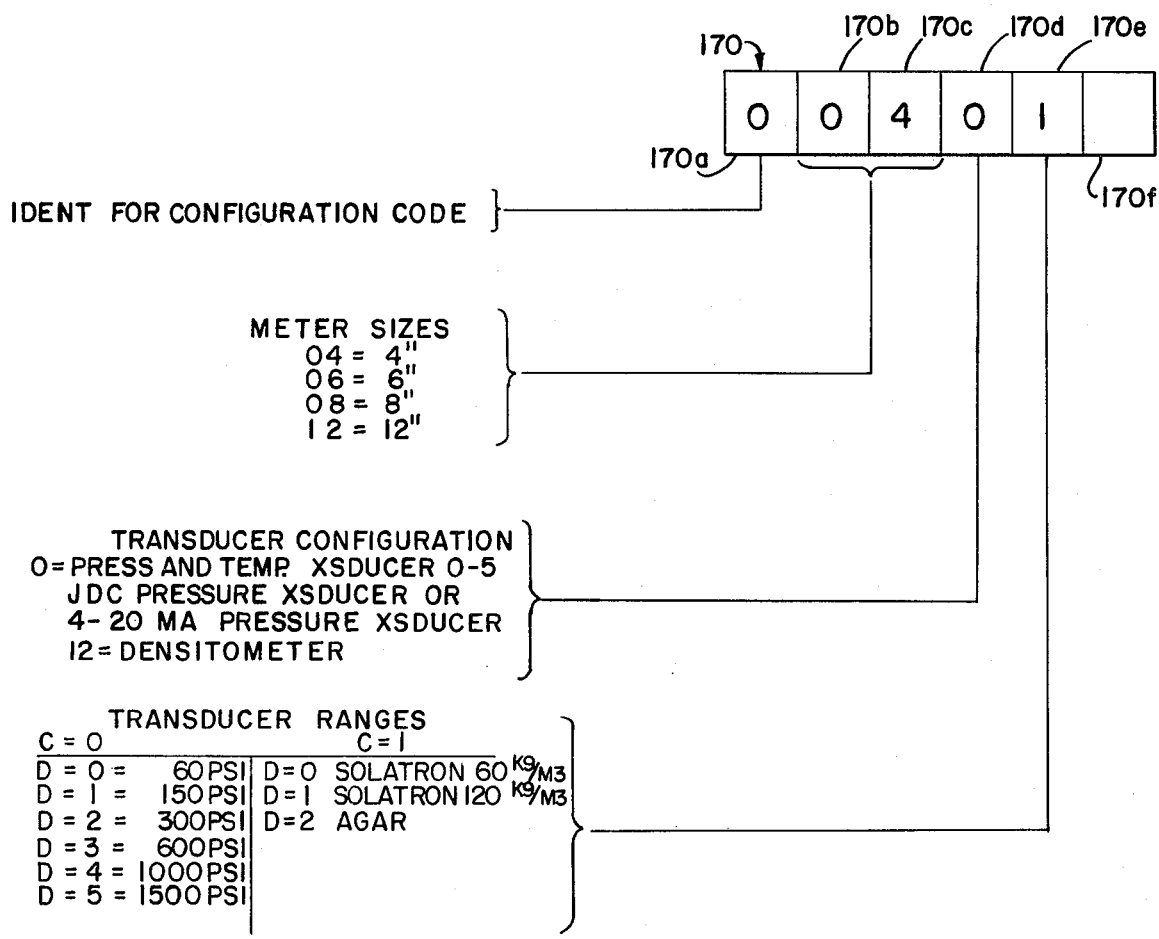
FIG. 8 is a diagram illustrating the configuration code as entered through the thumbwheel switch assembly of the display panel shown in more detail in FIG. 4; and, FIGS. 9A and B, and 10A and B are detailed circuit diagrams of the gas flow computer as generally shown in FIG. 3.

The GASP subroutine, as shown in FIG. 7C, is associated with the information to be displayed upon the display panel 184 and in particular sequences the information to be displayed and appropriately scales the information so that the most significant digits are displayed and maximum information is displayed upon the digital display 182. In FIG. 8, there is shown the configuration code in which the data as entered upon the first five thumbwheel switches 170a, 170b, 170c, 170d, and 170e, identifies the characteristics of the entire system, e.g. the pressure of the gas flow and the size of the turbometer 112. In particular, thumbwheel switch 170a is set to zero to identify that a configuration code is being entered. Thumbwheel switches 170b and 170c are set in accordance with the particular size of the turbometer 112, whereas thumbwheel switch 170d is set to specify the type of pressure transducer 120 and temperature transducer 124 incorporated into the system (or whether a densitometer is used). Thumbwheel switch 170e indicates which of a plurality of pressure ranges is to be measured, or if a densitometer is included, the density ranges that are contemplated to be measured. Thus, upon the actuation of the display select switch 186n, the entered configuration code is decoded in step 569 and the GASP subroutine branches successively or cyclically to each of the ten steps 570, 572, 574, 578, 580, 582, 583, 584, 586 and 588. For example, the first value to be read out upon the display panel 184 corresponds to the base gas volume in standard cubic feet per hour and to effect this, the subroutine is branched to step 570, wherein the most currently-calculated value of the standard volume $V_b$ as calculated by the last-occurring routine SR-A (as shown and described above with respect to FIGS. 7A and 7B), is read out and scaled dependent upon the particular turbometer, pressure transducer 120 and temperature transducer incorporated into the system. Thereafter, the GASP subroutine is sequenced to block 578, where the current value of flow or line cubic feet hours is obtained and scaled appropriately. Next, the subroutine branches to step 584, wherein the most current value of line pressure $P_f$ is obtained and appropriately scaled to be displayed. Then, the values of line temperature, supercompressibility, line or flow density, percent of maximum flow, the specific gravity factor, the self-test subroutine and the meter factor, are obtained by steps 572, 580, 586, 574, 582, 588 and 583, respectively. After obtaining the scaled values of each of the aforementioned values, they are moved to an output buffer in the RAM 192 and a zero suppression step is performed by step 576. Thereafter, step 590 loads the constant or value as stored in the output buffer area of the RAM 192 into the display latches (as included within the logic circuit 178) and the logic circuit 178 is commanded to energize the corresponding LED 186 and to apply the appropriate data to the display meter 182. At this point, the GASP subroutine is completed and the routine is returned.

In FIG. 7D, there is shown a detailed flow diagram of the PFIN subroutine that serves to control the data shift in the A/D converter and in particular, the data indicative of the measured line pressure as derived from the pressure transducer 120 and to store it in a designated area of the RAM 192. Initially, step 600 sets the multiplexer 160 to receive the pressure signal as derived from the pressure transducer 120 via the signal conditioner 132. Next, a subroutine A/D 602 (as shown in FIG. 7F) is executed, which basically tests the operability of the pressure transducer 120 before continuing with the PFIN subroutine. Thereafter, the pressure indicating data as stored in the registers of the analog-to-digital converter 162 is unpacked by step 604 and transferred via the input/output device 164 and the instruction data bus 181 to a designated area, i.e., the pressure work register, of the RAM 192. Thereafter, the transferred pressure indicating data is shifted left by step 606 within the pressure work area of the RAM 192 to suppress zeros. Thereafter, step 608 makes a check to determine whether the pressure of the gas flow within the conduit 110 is zero, and if it is, step 614 loads zeros into the display buffer and sets a flag for no pressure, whereby the fault condition LED 186q is energized. If the pressure is determined not to be zero by step 608, the PFIN subroutine branches to step 610 wherein the data indicative of the measured pressure is scaled and an appropriate exponent thereof is set. Thereafter, the pressure data is moved by step 612 into another section of the RAM 192 that may be accessed for the subsequent supercompressibility factor calculations, and thereafter the subroutine PFIN is completed and returned.

Figure 7E:
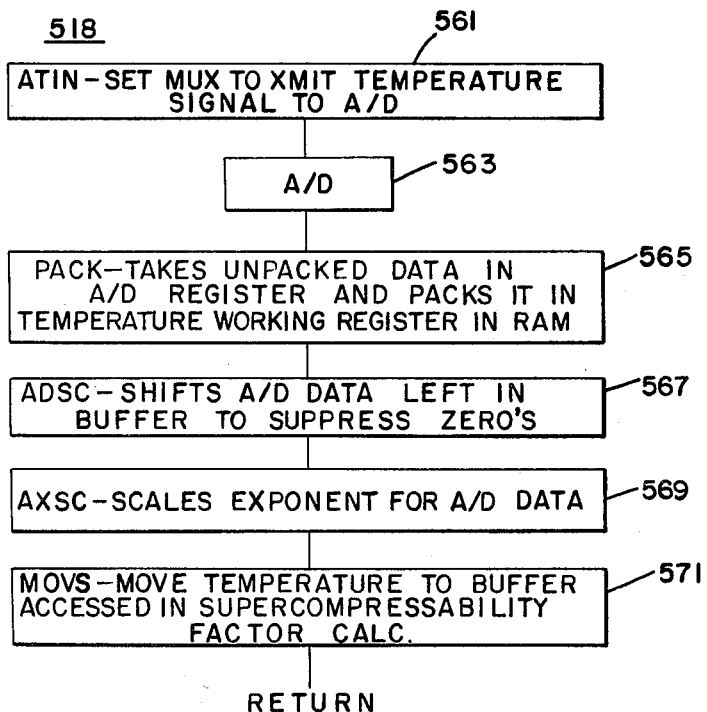
Figure 7F:
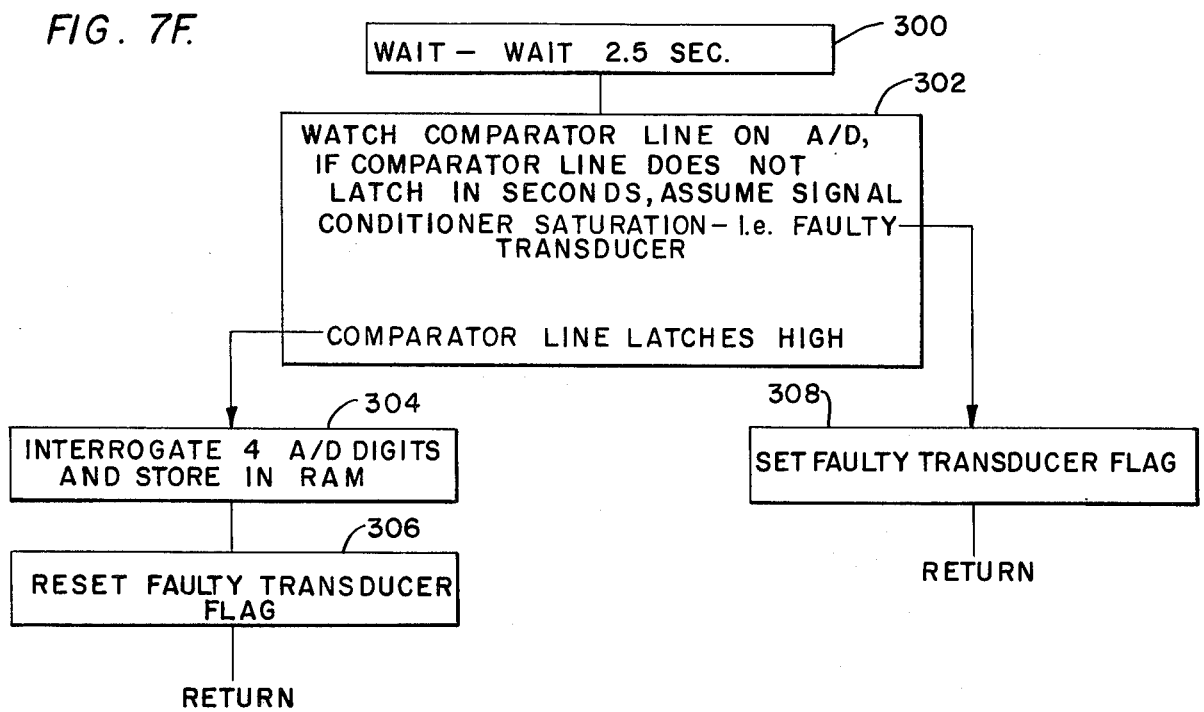

The subroutine TFIN, the steps of which are shown in FIG. 7E, is similar to the PFIN routine previously discussed, and performs similar functions to transmit data indicative of temperature to an appropriate area in the RAM 192. In particular, the initial step 561 sets the multiplexer 160 to transmit the output of the temperature transducer 124 via its signal conditioner 160 to the analog-to-digital converter 162. Thereafter, an A/D routine 563 (as shown in FIG. 7F) is executed to check the operability of the temperature transducer 124. If operable, the subroutine TFIN continues to step 565, wherein the temperature-indicating data is unpacked from a register within the analog-to-digital converter 162 and transferred via the input/output device 164 and the instruction data bus 181 to an area within the RAM 192 known as the temperature working register. Thereafter, step 567 shifts the transferred temperature-indicating data left within the temperature working register to suppress zeros. Next, step 569 provides an appropriate scaling exponent for the data to be displayed and in step 571, the temperature-indicating data is moved to a second, different area in the RAM 192 that may be accessed during the supercompressibility factor calculations to obtain the current value of temperature. Thereafter, the subroutine TFIN is completed and returned.

With regard to FIG. 7F, there is shown a low-level flow diagram of the A/D subroutine, wherein the operability of the pressure transducer 120 or the temperature transducer 124 is checked. Its initial step 300 delays accessing the appropriate register within the A/D converter 162, to obtain the previously-loaded indication of temperature or pressure, for a period illustratively in the order of 2.5 seconds. After the noted delay, step 302 compares the output of the A/D register to determine whether it is above a predetermined level, and if the output does not fall within a predetermined period of seconds below that predetermined level, it is assumed that the signal conditioning circuit 132 or 130 has gone to saturation, indicating a corresponding faulty transducer. If step 302 determines that its corresponding transducer is faulty, the subroutine A/D branches to step 308, wherein a FAULTY TRANSDUCER flag is set to energize the fault condition LED 186q. If the corresponding transducer is determined to be operable, i.e., the comparator indicates a high condition, the subroutine A/D branches to step 304 to interrogate and unload the four most significant digits within the output register of the A/D converter 162 and to transfer same via the input/output device 164 and the instruction data bus 181 to a designated storage area within the RAM 192. Thereafter, step 306 resets any FAULTY TRANSDUCER flag that may have been raised and the subroutine A/D is completed and is returned.

Figure 7G:
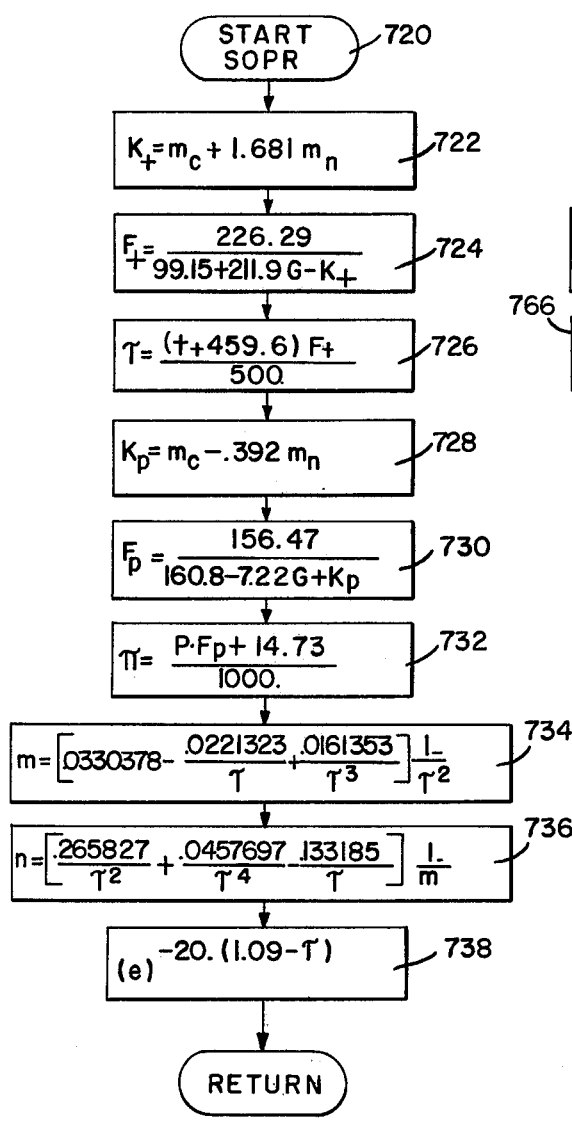
Figure 7H:
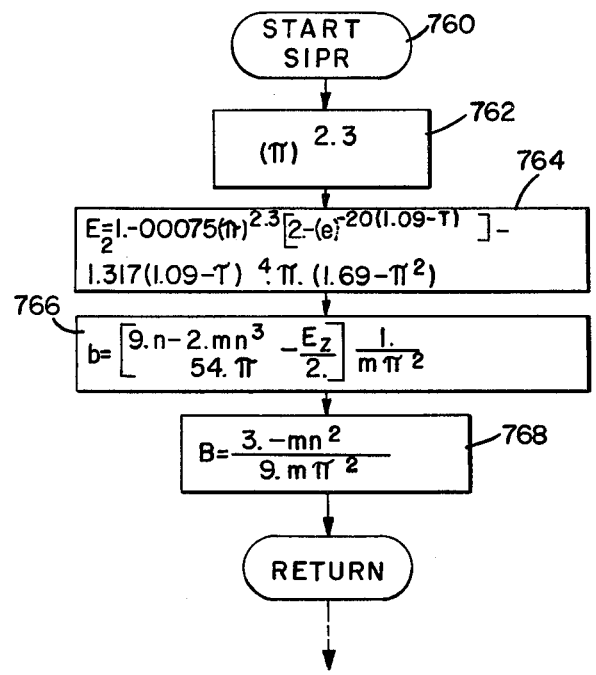
Figure 7I:
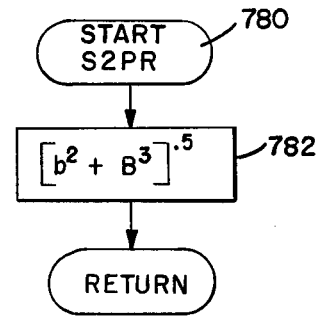
Figure 7J:
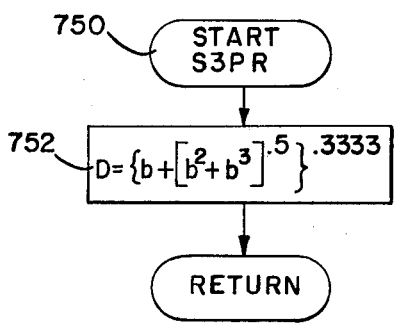
Figure 7K:
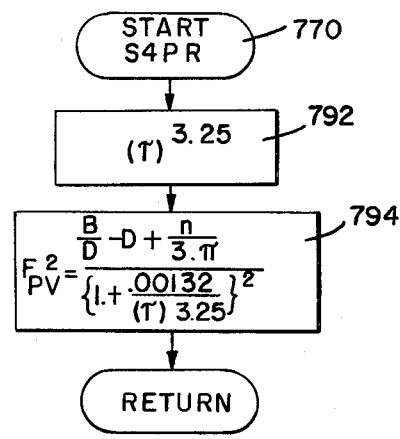

In FIGS. 7G, 7H, 7I, 7J and 7K, there are shown, respectively, the detailed flow diagrams of the subroutines S0PR, S1PR, S2PR, S3PR and S4PR of the REPETITIVE COMPUTE CYCLE program as generally shown in FIG. 5. Generally, as a review of the calculations indicated within the blocks of each of these subroutines will indicate, the calculations of the equations (2) to (14) have been broken down into manageable increments to be performed by these subroutines. For example, with respect to the subroutine S0PR, it is initiated, as shown in FIG. 7G, in block 720 and continues through to step 738. In particular, step 722 performs the calculations of equation (3) given above, step 724 performs equation (4), step 726 performs equation (5), step 728 performs equation (6), step 730 performs equation (7), step 732 performs equation (8), step 734 performs equation (9), step 736 performs equation (10) and the final step of subroutine S0PR performs a portion of equation (14). With regard to FIG. 7H, there is shown the details of subroutine S1PR, which is initiated in block 760. In step 762, a further portion of equation (14) is performed and the values as calculated in steps 762 and 738 are entered into the calculations of step 764, which carries out the complete calculations of equation (14). Step 766 performs the calculations of equation (13) and step 768 performs the calculations of equation (11). In FIG. 7I, the subroutine S2PR is started in block 780 and the subsequent step 782 performs the calculations of a portion of equation (12). In FIG. 7J, the subroutine S3PR starts in block 750, and a further part of equation (12) is calculated in step 752. In FIG. 7K, the subroutine S4PR starts in block 790 and a portion of equation (2) is calculated in step 792. In step 794, the various values as calculated in steps 752, 768, 792 and 736 are available, and the calculations of equation (2) are completed.

Figure 7L:
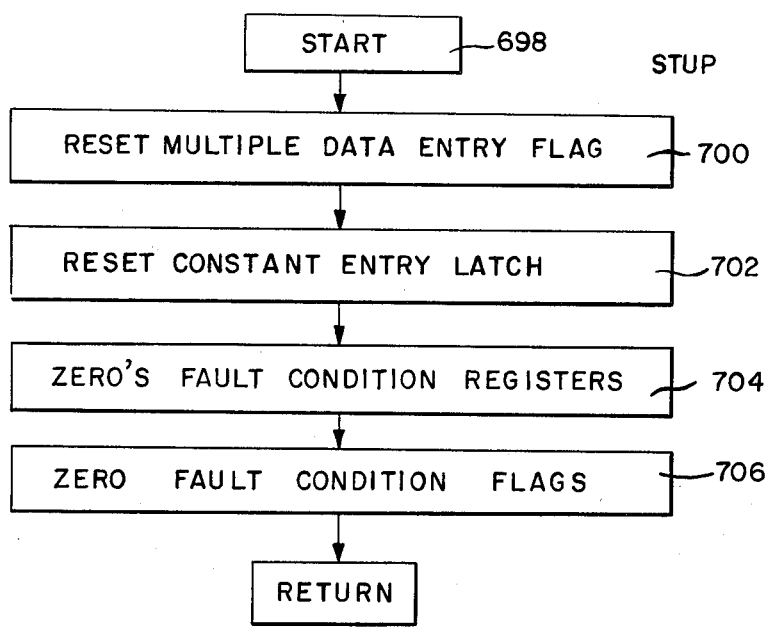

In FIG. 5, it is seen that each of the S calculation subroutines 340a, 340b, 340c, 340d and 340e includes a number of maintenance routines, including STUP, as shown in detail in FIG. 7L. The subroutine STUP is started in block 698 and continues to step 700 wherein multiple entries via the thumbwheel switch assembly 170 of the display panel 184 is detected and a flag is set. For example, the operator may be in the process of setting the thumbwheels which would provide to the control system more than a single entry for one of the constants. In that instance, the step 700 sets a multiple data entry flag, thus causing such data to be ignored. Thereafter, step 702 resets the constant entry latch as contained within the logic circuitry 172 of FIG. 3. In step 704, the fault condition registers as contained within the RAM 192 are cleared by the entry of zeros therein. With the fault condition register prepared by clearing, step 706 tests for various fault conditions as would occur if any of the transducers 120, 124 and 112 was defective, and if a defect is found, a corresponding flag is set. At this point, the subroutine STUP returns.

Figure 7M:
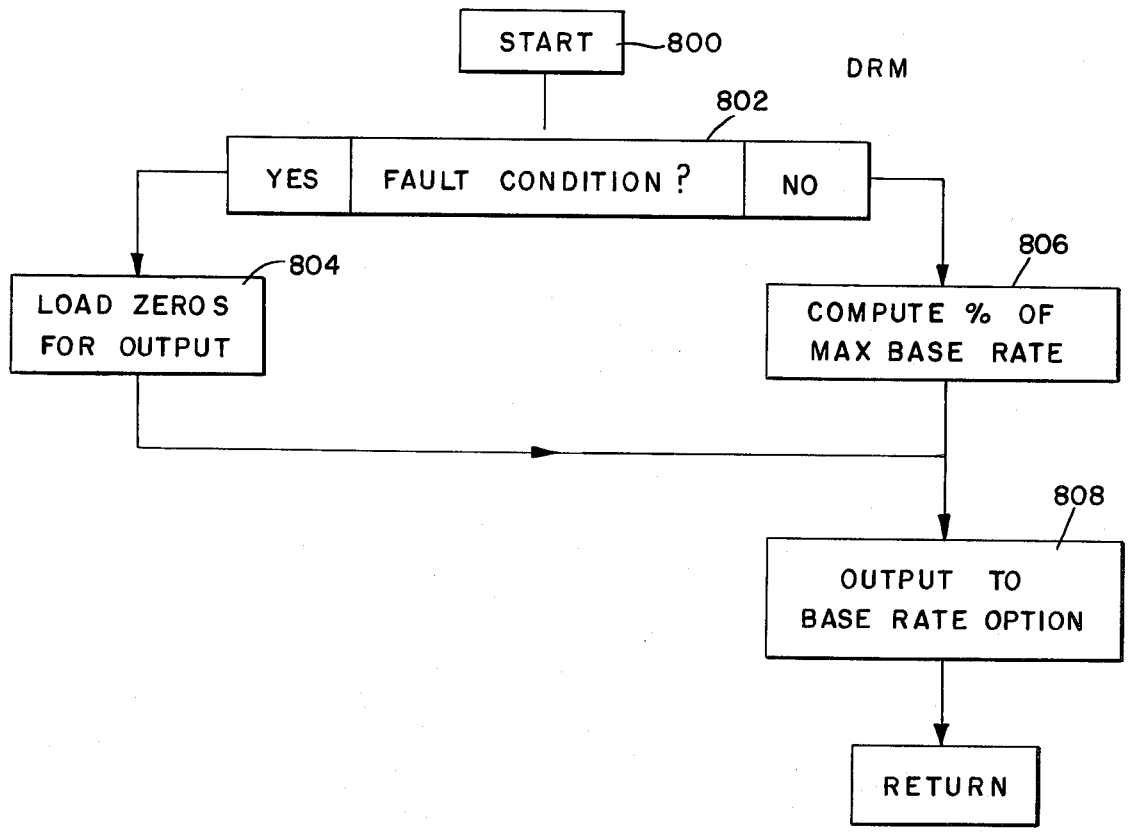

The subroutine SR-A includes a subroutine DRM, apearing as a step 568 in FIG. 7B and which is illustrated further in FIG. 7M. The subroutine DRM serves primarily to sense by step 802 the absence of an output from one of the temperature transducer 124, the pressure transducer 120 or the turbometer 112, that indicates a zero flow of the gas to be measured. If such a fault condition is detected, the subroutine DRM transfers to step 804 which causes three zeros to be entered within a counter (not shown) within the logic circuitry 178 of FIG. 3, to indicate the zero flow of gas through the turbometer 112. If in step 802 it is determined that there are no fault conditions, the subroutine DRM moves to step 806 wherein the percentage of the maximum rate of flow taken to a base or reference value is calculated. In particular, a maximum base rate of flow is previously calculated and is entered into the system to be used by step 806 to calculate a particular percentage thereof that is flowing through the system at a given instant in time. As described earlier with respect to step 564 of FIG. 7B, the standard cubic feet hours is calculated as by equation B of the MASA subroutine and this value is used with the maximum base rate of flow to calculate a percentage figure which is displayed upon the digital display 182 of the display panel 184. After either of steps 804 or 806, the subroutine DRM moves to step 808 which transfers either the calculated value of percentage of maximum base rate or the zero value to develop a signal of from 0 to 40 Hz, dependent upon the percentage value so calculated. In particular, a plurality of programmable dividers within the logic circuitry 178 divides by a variable output of the output counters, as described above, a fixed reference signal to obtain the 0 to 40 Hz signal with a 40 Hz signal indicative of 100% base flow of the gas. The 0 to 40 Hz signal in turn is applied to the digital display 182 to provide, when LED 186h is energized, a digital indication of the percentage of maximum base rate of the flow of the gas.

Thus, there has been described a system and a method of control and calculation for determining with great accuracy the base or standard volume $V_b$ of gas adjusted to base conditions of temperature and pressure, that also provides continuous displays of the various measured parameters, including line gas flow, line pressure, line temperature, the various constants that are entered to enable these calculations, and an indication of the supercompressibility factor S. In calculating the base volume $V_b$, it is necessary to calculate with great accuracy and without using any approximations, the value of the supercompressibility factor S. To this end, a computer is used wherein a plurality of successive computer cycles is used to perform a part of the calculations necessary to determine the supercompressibility factor S. During each such compute cycle, a calculation of the base volume $V_b$ is made and is available for display along with the other measured values and previously-calculated values. Thus, there is provided a system and method of measurement and calculation that is readily adapted to operate under a great variety of conditions of gas pressure and gas temperature that is capable of providing with extreme accuracy an indication of the adjusted or base volume of the gas flow. By providing such accurate measurement, the transfer and sale of gas may be done with greater accuracy and in view of the great quantities and increasing price of gas and particularly natural gas, the method and system of this invention permits significant savings of money.

Numerous changes may be made in the above-described apparatus and the different embodiments of the invention may be made without departing from the spirit thereof; therefore, it is intended that all matter contained in the foregoing description and in the accompanying drawings shall be interpreted as illustrative and not in a limiting sense.

What is claimed is:

1. A measuring and calculating system for providing with high accuracy a manifestation of base gas volume $V_b$ adjusted to given base conditions of pressure $P_b$ and temperature $T_b$ of a gas flowing through a conduit, said system comprising:
   (a) first means for measuring the temperature $T_f$ of the gas flowing through the conduit and for providing a first electrical signal indicative thereof;
   (b) second means for measuring the pressure $P_f$ of the gas flowing through the conduit and for providing a second electrical signal indicative thereof;
   (c) third means for measuring the volume $V_f$ of the gas flowing through the conduit and providing a third electrical signal indicative thereof; and
   (d) calculating means for calculating base gas volume $V_b$ in accordance with the following equation:

$$V_b = (V_f)(\frac{P_F}{P_b})(\frac{T_b}{T_F})(S)$$

where S is the compressibility factor and is calculated as a function of specific gravity G and the mole percentages of the constituents of the gas flowing through said conduit, $P_F$ equals $P_f$+ atmospheric pressure base and $T_F$ equals $459.67 + T_f$), said calculating means further including:
(1) means for entering a value of the specific gravity G and the mole percentages, and
(2) means for performing a series of calculating cycles for obtaining intermediate values of the factor S, whereby an accurate manifestation without approximation of values of S is obtained as a function of the first and second electrical signals, and the entered values of specific gravity G and mole percentages.

2. The measuring and calculating system as claimed in claim 1, wherein said calculating means comprises a programmed digital computer.

3. The measuring and calculating system as claimed in claim 1, wherein said calculating means includes intermediate means for calculating a value of $V_b$ for each of said series of calculating cycles.

4. The measuring and calculating system as claimed in claim 3, wherein said intermediate calculating means during the initial calculation of $V_b$ utilizes an approximate value of S, and means for entering said given, approximate value of S.

5. The measuring and calculating system as claimed in claim 3, wherein said intermediate means for calculating, calculates $V_b$ in a given calculating cycle using the value of S calculated in the previous calculating cycle.

6. The calculating and measuring system as claimed in claim 1, wherein there is included display means including a non-volatile means for displaying an indication of the calculated base volume $V_b$.

7. The calculating and measuring system as claimed in claim 1, wherein there is included means for displaying values as calculated or measured by said system, and a plurality of indicating means energized to identify the value being displayed by said means.

8. The calculating and measuring system as claimed in claim 1, wherein said entering means is manipulated to enter a configuration code, and said calculating means comprising means for decoding the configuration code for providing an indication of the range of volume and pressure of the gas being measured.

9. The measuring and calculating system as claimed in claim 8, wherein said calculating means is responsive to the decoded configuration code to provide factors by which the displayed values of the measured and calculated values are displayed in accordance with the ranges of pressure and volume of the gas flowing through the conduit.

10. The measuring and calculating system as claimed in claim 1, wherein there is included display means, and said calculating means further comprises means for checking the operability of said first, second and third measuring means and if one thereof is defective, to energize said display means to provide a manifestation thereof.

11. The measuring and calculating system as claimed in claim 10, wherein said calculating means is coupled to said second measuring means to determine if the pressure and volume of the gas flowing through the conduit is below a minimum value, and if so, for energizing said display means to provide a fault condition manifestation thereof.

12. The measuring and calculating system as claimed in claim 1, wherein there is included display means for digitally displaying the calculated values by said calculating means, the measured values by said first, second and third measuring means, and the entered constants by said entering means, and said calculating means including means for processing the measured and calculated values and entered constants to be so displayed so that only the most significant digits thereof are displayed upon said digital display means, while storing the remaining, less significant digits of said values or constants.

13. The measuring and calculating system as claimed in claim 1, wherein said means for entering values enters value of mole percentages of diluents of carbon dioxide and nitrogen within the gas.

14. A measuring and calculating system for providing with high accuracy a manifestation of base gas volume $V_b$ adjusted to given base conditions of pressure $P_b$ and temperature $T_b$ of a gas flowing through a conduit, said system comprising:
(a) means for measuring the density D of the gas flowing through the conduit and for providing a first electrical signal indicative thereof;
(b) means for measuring the volume $V_f$ of the gas flowing through the conduit and providing a second electrical signal indicative thereof; and
(c) calculating means for calculating base gas volume $V_b$ in accordance with the following expression:

$$V_b = (V_f)(\frac{P_f}{T_f}) \cdot D \cdot S,$$

whereas S is the compressibility factor and is calculated as a function of specific gravity G of and its mole percentages of the constituents of the gas flowing through said conduit, said calculating means further including:
(1) means for entering a given value of the specific gravity and the mole percentages, and
(2) means for performing a series of calculating cycles for obtaining intermediate values of the factor S, whereby an accurate manifestation without approximation of values of S is obtained as a function of the first and second electrical signals, and the entered values of specific gravity G and mole percentages.

15. The measuring and calculating system as claimed in claim 14, wherein said means for entering values is adopted to enter values of atmospheric pressure base, contract pressure base and meter factor.

16. A measuring and calculating system for providing with high accuracy a manifestation of base gas volume $V_b$ adjusted to given base conditions of pressure $P_b$ and temperature $T_b$ of a gas flowing through a conduit, said system comprising:
(a) first means for measuring the line temperature $T_f$ of the gas flowing through the conduit and for providing a first electrical signal indicative thereof;
(b) second means for measuring the line pressure $P_f$ of the gas flowing through the conduit and for providing a second electrical signal indicative thereof;
(c) third means for measuring the volume $V_f$ of the gas flowing through the conduit and providing a third electrical signal indicative thereof;
(d) calculating means for calculating base gas volume $V_b$ in accordance with the following equation:

$$V_b = (V_f)(\frac{P_F}{P_b})(\frac{T_b}{T_F})(S)$$

where S is the compressibility factor and is calculated as a specific function of gravity G and the mole percentages of the constituents of the gas flowing through said conduit, $P_F$ equals $P_f+$ atmospheric pressure base and $T_F$ equals $459.67+T_f$, said calculating means further including:

(1) means for entering a value of the specific gravity G and the mole percentages, (2) means for performing a series of calculating cycles for obtaining intermediate values of the factor S, whereby an accurate manifestation without approximation of values of S is obtained as a function of the first and second electrical signals, and the entered value of specific gravity G and mole percentages:

(d) means for storing in distinct memory locations values of line temperature $T_f$, line pressure $P_f$, adjusted temperature $T_b$, adjusted pressure $T_b$, line volume $V_f$, base gas volume $V_b$, specific gravity and mole percentages;

(e) display means including first means for displaying one of the values stored in said storing means and including second means for indicating which of the stored values is being displayed by said first means; and (f) means for selectively reading a value stored in said storing means to be displayed by said display means.

17. The measuring and calculating system as claimed in claim 16 wherein said storing means volatilely stores said values and there is included means for non-volatilely storing and displaying a manifestation of the calculated base gas volume $V_b$.

18. The measuring and calculating system as claimed in claim 17, wherein said calculating means energizes said non-volatile display means to change the manifestation of base volume $V_b$ by an incremental amount and includes means for determining whether in the previous calculating cycle or cycles, sufficient base gas volume $V_b$ has been measured, and if so, for actuating said non-volatile display means by an incremental amount, and means for disposing the remainder of the base volume to be stored in said volatile storing means.

19. A measuring and calculating system for providing with high accuracy a manifestation of base gas volume $V_b$ adjusted to given base conditions of pressure $P_b$ and temperature $T_b$ of a gas flowing through a conduit, said system comprising:

(a) first means for measuring the temperature $T_f$ of the gas flowing through the conduit and for providing a first electrical signal indicative thereof;

(b) second means for measuring the pressure $P_f$ of the gas flowing through the conduit and for providing a second electrical signal indicative thereof;

(c) third means for measuring the volume $V_f$ of the gas flowing through the conduit and providing a third electrical signal indicative thereof; and (d) calculating means for calculating base gas volume $V_b$ in accordance with the following equation:

$$V_b = (V_f)(\frac{P_F}{P_b})(\frac{T_b}{T_F})(S)$$

where S is the compressibility factor and is calculated as a specific function of gravity G and the mole percentages of the constituents of the gas flowing through said conduit, $P_F$ equals $P_f+$ atmospheric pressure base and $T_F$ equals $459.67 + Tf$), said calculating means further including:

(1) means for entering a value of the specific gravity G and the mole percentages, (2) means for performing a series of calculating cycles for obtaining intermediate values of the factor S, whereby an accurate manifestation without approximation of values of S is obtained as a function of the first and second electrical signals, and the entered value of specific gravity G and mole percentages, and (3) intermediate means for calculating and accumulating a value of $V_b$ for each of said calculating cycles using the value of S calculated in the previous cycle;

(e) means for storing in distinct memory locations values of line temperature $T_f$, line pressure $P_f$, adjusted temperature $T_b$, adjusted pressure $T_b$, line volume $V_f$, base gas volume $V_b$, mole percentages and specific gravity;

(f) display means including first means for displaying one of the values stored in said storing means and second means for indicating which of the stored values is being displayed by said first means; and (g) means for selectively reading a value stored in said storing means to be displayed by said display means.

20. The measuring and calculating system as claimed in claim 19, wherein said storing means volatilely stores said values and there is included means for non-volatilely storing and displaying a manifestation of the calculated base gas volume $V_b$.

21. The measuring and calculating system as claimed in claim 20, wherein said calculating means energizes said non-volatile display means to change the manifestation of base volume $V_b$ by an incremental amount and includes means for determining whether in the previous calculating cycle or cycles, sufficient base gas volume $V_b$ has been measured, and if so, for actuating said non-volatile display means by an incremental amount, and means for disposing the remainder of the base volume to be stored in said volatile storing means.

* * * * *